(12) United States Patent
Shrestha et al.

(10) Patent No.: US 11,195,067 B2
(45) Date of Patent: Dec. 7, 2021

(54) SYSTEMS AND METHODS FOR MACHINE LEARNING-BASED SITE-SPECIFIC THREAT MODELING AND THREAT DETECTION

(71) Applicant: Ambient AI, Inc., Palo Alto, CA (US)

(72) Inventors: Shikhar Shrestha, Palo Alto, CA (US); Vikesh Khanna, Palo Alto, CA (US)

(73) Assignee: Ambient AI, Inc., Palo Alto, CA (US)

( * ) Notice: Subject to any disclaimer, the term of this patent is extended or adjusted under 35 U.S.C. 154(b) by 0 days.

(21) Appl. No.: 16/695,538

(22) Filed: Nov. 26, 2019

(65) Prior Publication Data

US 2020/0202184 A1 Jun. 25, 2020

Related U.S. Application Data

(60) Provisional application No. 62/784,227, filed on Dec. 21, 2018.

(51) Int. Cl.
*G06K 9/72* (2006.01)
*G06K 9/62* (2006.01)
*G06F 16/901* (2019.01)
*G06N 3/04* (2006.01)
*G06N 3/08* (2006.01)

(52) U.S. Cl.
CPC ......... *G06K 9/726* (2013.01); *G06F 16/9024* (2019.01); *G06K 9/6288* (2013.01); *G06N 3/0418* (2013.01); *G06N 3/08* (2013.01)

(58) Field of Classification Search
CPC ........... G06K 9/00335; G06K 9/00771; G06K 9/6288; G06K 9/726; G06K 2009/00738; G06F 16/9024; G06N 3/0418; G06N 3/0472; G06N 3/08; G06N 20/00; G06N 7/005
See application file for complete search history.

(56) References Cited

U.S. PATENT DOCUMENTS

| 9,665,777 | B2 | 5/2017 | Naikal et al. |
| 9,746,988 | B2 | 8/2017 | Kim et al. |
| 9,883,165 | B2 | 1/2018 | Denizot et al. |
| 10,783,487 | B2 | 9/2020 | Estill |
| 2004/0119819 | A1 | 6/2004 | Aggarwal et al. |
| 2006/0093190 | A1 | 5/2006 | Cheng et al. |
| 2006/0268108 | A1 | 11/2006 | Abraham |

(Continued)

OTHER PUBLICATIONS

Boufarguine, Mourand , et al., "Virtu4D: a Real-time Virtualization of Reality", 5th International Symposium 3D Data Processing, Visualization and Transmission, 2010.

(Continued)

*Primary Examiner* — Michael J Huntley
*Assistant Examiner* — Marshall L Werner
(74) *Attorney, Agent, or Firm* — Jeffrey Schox; Diana Lin

(57) ABSTRACT

A surveillance system is coupled to a plurality of sensor data sources arranged at locations within a plurality of regions of a site under surveillance. The surveillance system accesses a threat model that identifies contextual events classified as threats. The surveillance system identifies at least one contextual event for a site in real-time by processing sensor data generated by the sensor data sources, and co-occurring contextual data for at least one of the regions. Each identified contextual event is classified as one of a threat and a non-threat by using the threat model.

14 Claims, 14 Drawing Sheets

(56) References Cited

U.S. PATENT DOCUMENTS

| | | |
|---|---|---|
| 2006/0279630 A1 | 12/2006 | Aggarwal et al. |
| 2011/0164163 A1 | 7/2011 | Bilbrey et al. |
| 2011/0249867 A1 | 10/2011 | Haas et al. |
| 2013/0128050 A1 | 5/2013 | Aghdasi et al. |
| 2014/0347475 A1 | 11/2014 | Divakaran et al. |
| 2015/0009031 A1* | 1/2015 | Bedros ............. G08B 13/122 340/566 |
| 2015/0235379 A1 | 8/2015 | Ogorman et al. |
| 2015/0350902 A1 | 12/2015 | Baxley et al. |
| 2016/0378861 A1 | 12/2016 | Eledath et al. |
| 2017/0054982 A1 | 2/2017 | Arumugam et al. |
| 2017/0308753 A1 | 10/2017 | Wu et al. |
| 2018/0067593 A1* | 3/2018 | Tiwari ............... G08B 13/22 |
| 2018/0219888 A1* | 8/2018 | Apostolopoulos ........................ H04L 63/1425 |
| 2019/0087646 A1* | 3/2019 | Goulden ........... G06K 9/00255 |

OTHER PUBLICATIONS

Guennoun, Mouhcine, et al., "Augmented Reality-Based Audio/Visual Surveillance System", 2008 IEEE International Workshop on Haptic Audio Visual Environments and Games, IEEE, 2008.

Sebe, Ismail Oner, et al., "3D Video Surveillance with Augmented Virtual Environments", First ACM SIGMM International Workshop on Video Survelliance. ACM, 2003.

\* cited by examiner

SYSTEMS AND METHODS FOR MACHINE LEARNING-BASED SITE-SPECIFIC THREAT MODELING AND THREAT DETECTION

CROSS-REFERENCE TO RELATED APPLICATIONS

This application claims the benefit of U.S. Provisional Application No., 62/784,227 filed 21 Dec. 2018, which is incorporated in its entirety by this reference.

TECHNICAL FIELD

This invention relates to the sensor fusion field, and more specifically to a new and useful machine learning-based site monitoring and security in the access security, machine learning, and sensor fusion fields.

BACKGROUND

Prevalent security and surveillance systems typically enable the monitoring and capture of video images of an area of interest to the entities implementing the systems. Over the course of some time period, such as a day, a week, or a month, such security and surveillance systems may capture significant amounts of video data, which is typically too great for any individual human, or multiple humans, to meaningfully review for the purposes of detecting events of interest including security events. Often such review is merely reactive to a security event or other event that has occurred in the past. While in some instances this type of review may be useful in resolving or addressing less time-sensitive security events or the like, this type of review is merely reactive and the time lost reviewing the video image data can adversely impact obtaining a desired result for time-sensitive security events by the entity implementing the security system.

However, even in real-time (or near real-time) monitoring and review of video images streaming from several surveillance video cameras of the security and surveillance systems can be extremely difficult for human detection of events of interest. Because in most circumstances, defined spaces that are under surveillance via the security and surveillance systems incorporate multiple video cameras, there might be time when there are more video feeds than there are security personnel available to monitor and review the video feeds. Thus, in a real-time monitoring and surveilling situation, many events of interests, including security events, may be missed, thereby compromising the security and/or safety of the defined space(s) and/or the subjects (e.g., persons, protected products, etc.) within the defined space.

Thus, there is a need to create a new and useful event detection system. The embodiments of the present application provide such new and useful systems and methods.

DESCRIPTION OF THE PREFERRED EMBODIMENTS

The following description of preferred embodiments of the present application are not intended to limit the inventions to these preferred embodiments, but rather to enable any person skilled in the art of to make and use these inventions.

1. System

As shown in FIG. 1, a system 100 includes at least one of: sensor data sources (e.g., 110a-c) (e.g., image data sources), a sensor data comprehension system (e.g., 120), sensor data storage (e.g., 128), contextual event storage (e.g., 152), a contextual data storage (e.g., 140), a contextual event detection system (e.g., 150), a user interface system (e.g., 130), a control system (e.g., 160), and a notification system (e.g., 170).

In some variations, the sensor data comprehension system 120 is similar to a comprehension system as described in U.S. patent application Ser. No. 16/137,782, filed 21-Sep.-2018, which is incorporated herein in its entirety by this reference. However, the sensor data comprehension system 120 can be any suitable type of comprehension system that functions to perform processes as described herein.

In some variations, the comprehension system 120 includes a context feature extractor 152 that functions to extract, from the sensor data, features associated with contextual factors.

In some variations, contextual factors include factors that identify time of the day, a region (e.g., "stairwell", "parking lot", "office", "kitchen", etc.) of a site, known individuals, unknown individuals, and the like.

In some variations, the comprehension system 120 includes a threat feature extractor 153 that functions to extract, from the sensor data, threat and non-threat features.

Figure 1A:
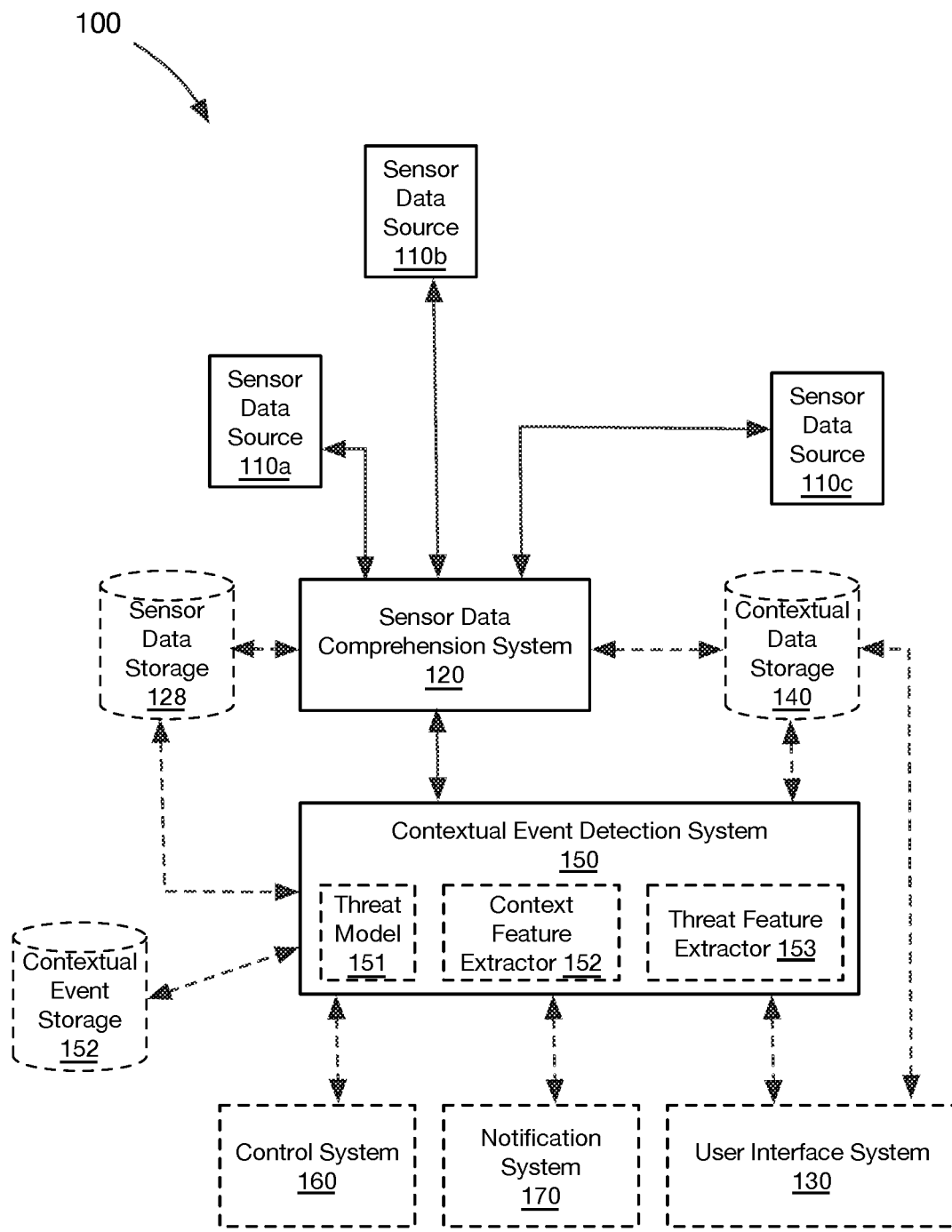
FIGS. 1A-C illustrate a schematic of a system, in accordance with embodiments.
Figure 1B:
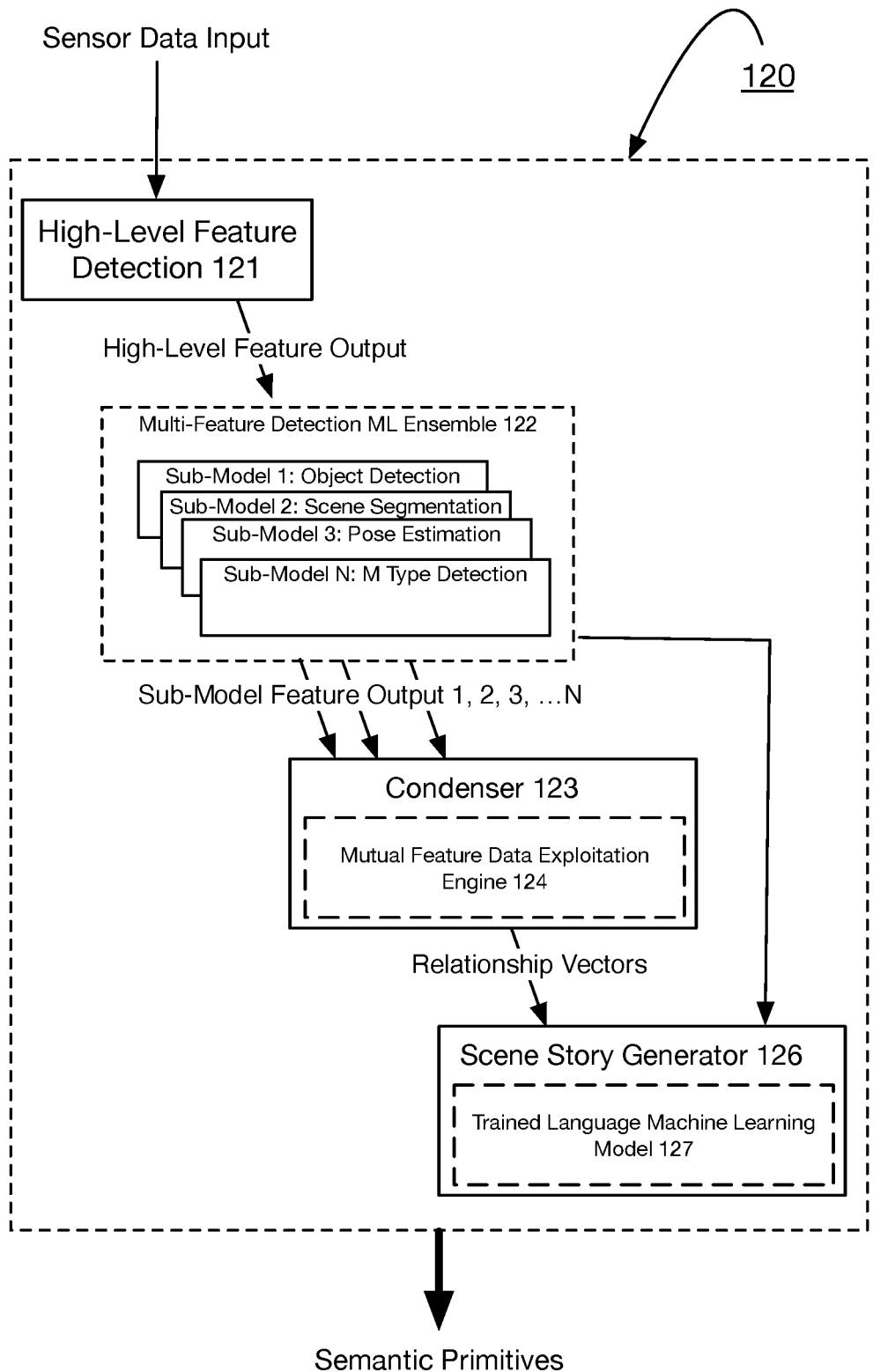

In some variations, the comprehension system 120 includes at least one of a high-level feature detection model 121, a multi-feature detection machine learning ensemble 122, a condenser 123, and scene a story generator 126 (e.g., as shown in FIGS. 1B and 1A). In some implementations, the condenser 123 includes a mutual feature data exploitation engine 124. In some implementations, the story generator includes a trained language machine learning model 127.

Figure 1C:
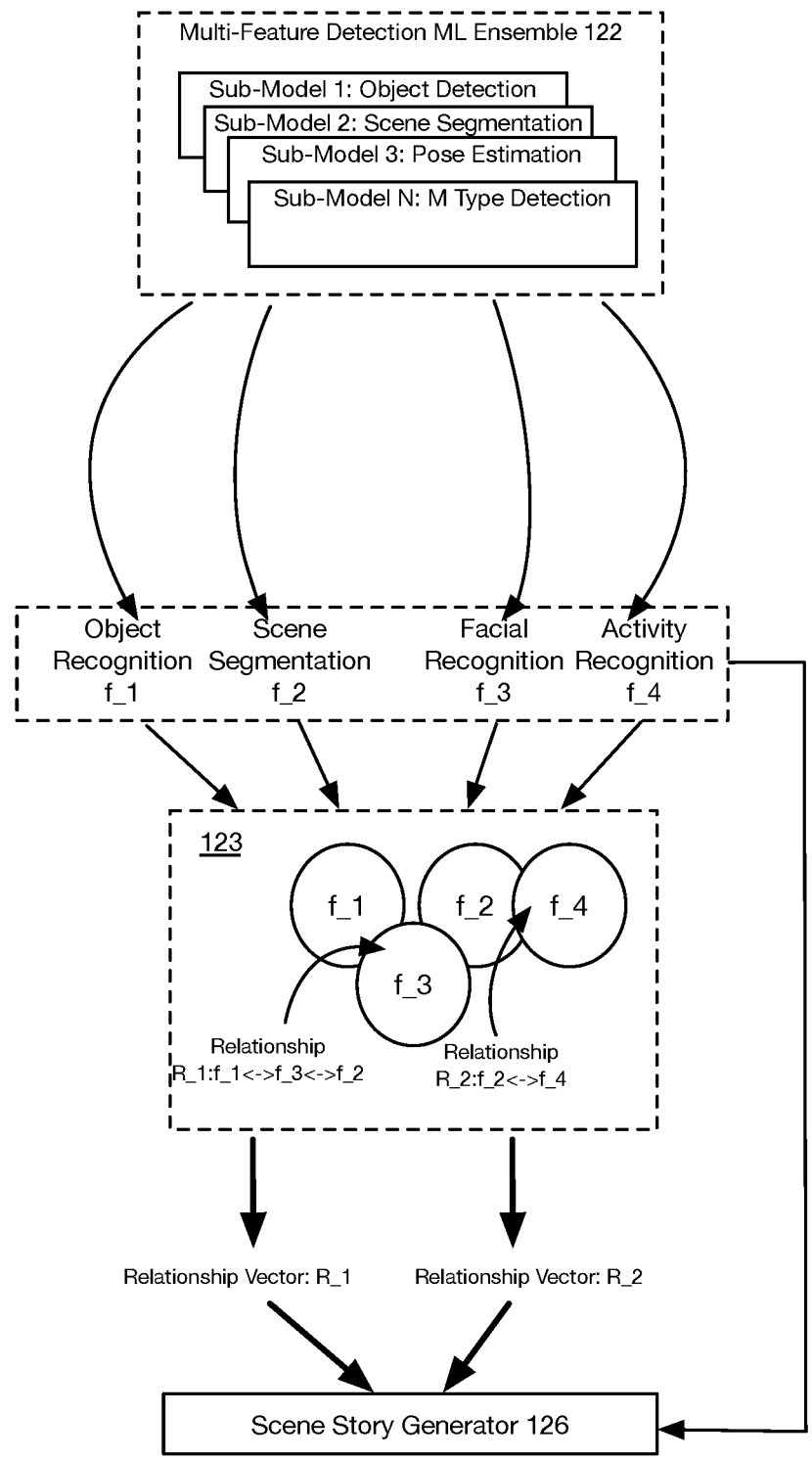

In some variations, the comprehension system 120 functions to collect sensor data (in any form) (e.g., image data) from the one or more sensor data sources (e.g., 110a-c) within the system 100. In some variations, the comprehension system 120 functions to implement a combined machine learning model core (e.g., a multi-feature detection machine learning ensemble 122) to detect relevant features within a scene defined by the collected sensor data. In some variations, the comprehension system 120 uses a condenser (e.g., 123) to form a composite of a plurality of feature outputs (e.g., f_1, f_2, f_3 . . . f_n) of the multiple sub-models of the combined model core (e.g., as shown in FIG. 1C). In some variations, from the composite, the system 120, using a mutual feature data exploitation engine (e.g., 124), functions to extract mutual/relationship data from overlapping segments of the composite and derives mutual/relationship vectors, as output (e.g., as shown in FIG. 1C). In some variations, the comprehension system 120 passes the plurality of feature data outputs and the mutual/relationship vectors to a story generator (e.g., 126) that functions to use a trained machine learning model (e.g., 127) to generate one or more event descriptions for the sensor data.

In some variations, the sensor data processed through the system 120 includes live sensor data relating to events and/or circumstances captured in real-time and/or near real-time (e.g., within 0-5 minutes or the like) by one or more sensor data sources (e.g., live-feed video cameras). Correspondingly, in some variations, the system 120 functions to digest the live sensor data in real-time or near real-time to generate timely event or circumstance intelligence.

In some variations, the one or more sensor data sources (e.g., 110a-c) function to capture sensor data of one or more areas of interest. In some variations, the system 120 functions to collect image data. In some variations, the sensor data sources include a plurality of types of sensor data sources (e.g., image sensors, heat sensors, temperature sensors, motion sensors, etc.) each functioning to generate a different type of data. In some variations, the system 120 functions to capture any type or kind of observable data of an area or scene of interest (e.g., by using one or more sensor data sources) including, but not limited to, thermal or heat data, acoustical data, motion and/or vibration data, object depth data, and/or any suitable data that can be sensed. The area of interest may be a fixed area in which a field of sensing (e.g., field of vision for an image capturing sensor) of a sensor data source may be fixed. Additionally, or alternatively, the area of interest may be dynamic such that a field of sensing of a sensor data source may change continuously or periodically to capture different areas of interest (e.g., a rotating video camera). Thus, an area of interest may be dependent on a position and corresponding field of sensing of a sensor data source (e.g., 110a-c). In some variations, the sensor data sources 110a-c preferably include an image capturing system comprising one or more image capturing devices. In some variations, the image capturing devices include at least one of: video cameras, still image cameras, satellites, scanners, frame grabbers, and the like that function to capture (in real-time) at least one of analog video signals, digital video signals, analog still image signals, digital still image signals, and the like. In some variations, digital images may be captured or produced by other sensors (in addition to light-sensitive cameras) including, but not limited to, range sensors, tomography devices, radar, ultra-sonic cameras, and the like.

In some variations the one or more sensor data sources 110a-c function to capture sensor data and transmit the sensor data via a communication network (e.g., the Internet, LAN, WAN, GAN, short-range communication systems, Bluetooth, etc.) to the system 120. In some variations, the system 120 functions to access or pull the captured data from the one or more sensor data sources (e.g., 110a-c). In some variations, at least one of the sensor data sources (e.g., 110a-c) is in direct or operable communication with the system 120, such that live sensor data captured at the one or more sensor data sources (e.g., 110a-c) are fed directly into the one or more machine learning classifiers and feature detection models of system 120. Thus, in such variations, the live sensor data may not be stored (in a permanent or semi-permanent storage device) in advance of transmitting the live sensor data to the one or more processing modules and/or sub-systems of the system 120. A technical advantage achieved of such implementation include real-time or near real-time processing of an event or circumstance rather than post event processing, which may delay a suitable and timely response to an urgent occurrence.

In some embodiments, one or more parts or sub-systems of the system 100 may be implemented via an on-premise system or device and possibly, in combination with a cloud computing component of the system 100. In such embodiments, the one or more sensor data sources (e.g., 110aoc) may function to both capture live sensor data in real-time and feed the live sensor data to the on-premise system for generating intelligence data from the live sensor data. In such variations, the on-premise system may include one or more hardware computing servers (e.g., 700 shown in FIG. 7) executing one or more software modules for implementing the one or more sub-systems, processes, and methods of the system 100.

In some variations, the one or more sensor data sources (e.g., 110a-c) are configured to optimize scene coverage thereby minimizing blind spots in an observed area or area of interest and additionally, optimize overlapping coverage areas for potential areas of significant interest (e.g., a highly secure area, etc.). In some variations, the system 120 functions to process together overlapping sensor data from multiple sensor data sources (e.g., 110a-c) recording sensor data of a substantially same area (e.g., overlapping coverage areas) of interest. The sensor data in these areas of interest having overlapping coverage may enable the system 120 to generate increased quality event description data for a scene because of the multiple vantage points within the overlapping sensor data that may function to enable an increased or improved analysis of an event or circumstance using the additional detail and/or variances in data collected from the multiple sensor data sources.

In some variations, the system 120 functions to access additional event data sources including additional sensor data sources, news feed data sources, communication data sources, mobile communication device data (from users operating in an area of interest, etc.) and the like. The additional event data may be ingested by system 120 and used to augment the event description data for a scene.

In some variations, the comprehension system 120 functions to analyze and/or process sensor data input preferably originating from the one or more sensor data sources (e.g., 110a-c).

In some variations, the high-level feature detection model 121 is a high-level deep learning model (e.g., a convolutional neural network, etc.) that functions extract high-level features from the sensor data accessed by the comprehension system 120. In some variations, feature extraction performed by the high-level deep learning model (e.g., a convolutional neural network, etc.) includes at least one of: edge/border detection, and other more abstract features with higher semantic information. In some variations, the high-level deep learning model functions to identify and extract coarse semantic information from the sensor data input from the one or more sensor data sources (e.g., 110a-c). In some variations, the high-level deep learning model implements an artificial neural network and functions to extract broad scene level data (and may optionally generate descriptive metadata tags, such as outdoor, street, traffic, raining, and the like for each of the distinctly identified features).

In some variations, the multi-feature detection machine learning ensemble 122 includes a plurality of sub-machine learning models, each functioning to perform a distinct feature detection and/or classification of features. In some variations, the plurality of sub-machine learning models functions to perform distinct feature detection tasks that include, but are not limited to: pose estimation, object detection, facial recognition, scene segmentation, object attribute detection, activity recognition, identification of an object (e.g., person ID, vehicle, ID, fingerprint ID, etc.), motion analysis (e.g., tracking, optical flow, etc.), and the like. In some variations, at least one of the sub-models uses the high-level features extracted by the high-level deep learning model to generate a vector in an n-dimensional hyperspace. In some implementations, at least one of the sub-models uses the high-level features extracted by the high-level deep learning model to generate a vector in an n-dimensional hyperspace for a particular computer vision task. In some variations, at least one of the sub-models extracts sensor data features directly from sensor data to generate a vector in an n-dimensional hyperspace. In some implementations, the system 120 functions to identify or classify any features of the accessed sensor data.

In some implementations, training a sub-model of the multi-feature detection machine learning ensemble 122 includes training at least one sub-model by using an output generated by at least one other sub-model of the ensemble 122.

In some implementations, training a sub-model of the multi-feature detection machine learning ensemble 122 includes training at least one sub-model to use high-level features generated by the high-level feature detection model 121 to generate semantic primitives.

In some implementations, semantic primitives are basic entities in metadata generated by the comprehension system 120.

In some implementations, each sub-model of the ensemble 122 is trained with a same feature vector (e.g., a feature vector representative of output generated by the high-level feature detection model 121). By virtue of the foregoing, the machine learning ensemble 122 can generate semantic primitives by processing high-level features extracted from sensor data, without processing the raw sensor data. In this manner, performance may be improved, as compared with systems in which each model of an ensemble processes raw sensor data.

In some implementations, validating a sub-model of the multi-feature detection machine learning ensemble 122 includes validating at least one sub-model by using an output generated by at least one other sub-model of the ensemble 122.

In some implementations, training a sub-model of the multi-feature detection machine learning ensemble 122 includes simultaneously training at least two sub-models by using an output generated by at least one the sub-models being trained. In some implementations, simultaneously training includes tuning the feature vector output by the high-level feature extraction model 121 based on output generated by at least one sub-model of the ensemble 122. By tuning the high-level feature extraction model 121 based on output generated by at least one sub-model of the ensemble 122, the high-level feature extraction model 121 can be tuned to reduce likelihood that the sub-models of the ensemble 122 output invalid results after processing the high-level feature vector output by the high-level feature extraction model 121. For example, in a case of an ensemble 122 that includes an object detection model and a scene detection model, the high-level feature extraction model 121 can be tuned to reduce the likelihood that the object detection model detects a car and the scene detection model detects a sidewalk (indicating a car driving on the sidewalk) after processing of the high-level feature vector (assuming that a car driving on the sidewalk is most probably an incorrect detection result, rather than an unlikely event).

In some variations, training the high-level feature extraction model 121 includes training the model 121 to minimize invalid results of the ensemble 122. Such training can include processing sensor data of a training set to generate high-level feature vectors, processing the high-level feature vectors by using each model of the ensemble 122 to generate an combined ensemble output that identifies an output of each sub-model of the ensemble, and validating the trained model 121 by classifying each combined ensemble output as either valid or invalid.

In some variations, a subset and/or all of the sub-models of the multi-feature detection machine learning ensemble are operated in parallel. In some variations, the high-level feature vector from the high-level feature extraction model 121 is provided to each of the sub-models at the same or substantially the same time (e.g., within 0-5 seconds, etc.), such that a contemporaneous evaluation, classification, and/ or feature detection may be performed simultaneously in each of the sub-models. In some variations, the sensor data from the one or more sensor data sources (e.g., 110a-c) are sourced to each of the sub-models at the same or substantially the same time (e.g., within 0-5 seconds, etc.), such that a contemporaneous evaluation, classification, and/or feature detection may be performed simultaneously in each of the sub-models.

Figure 7:
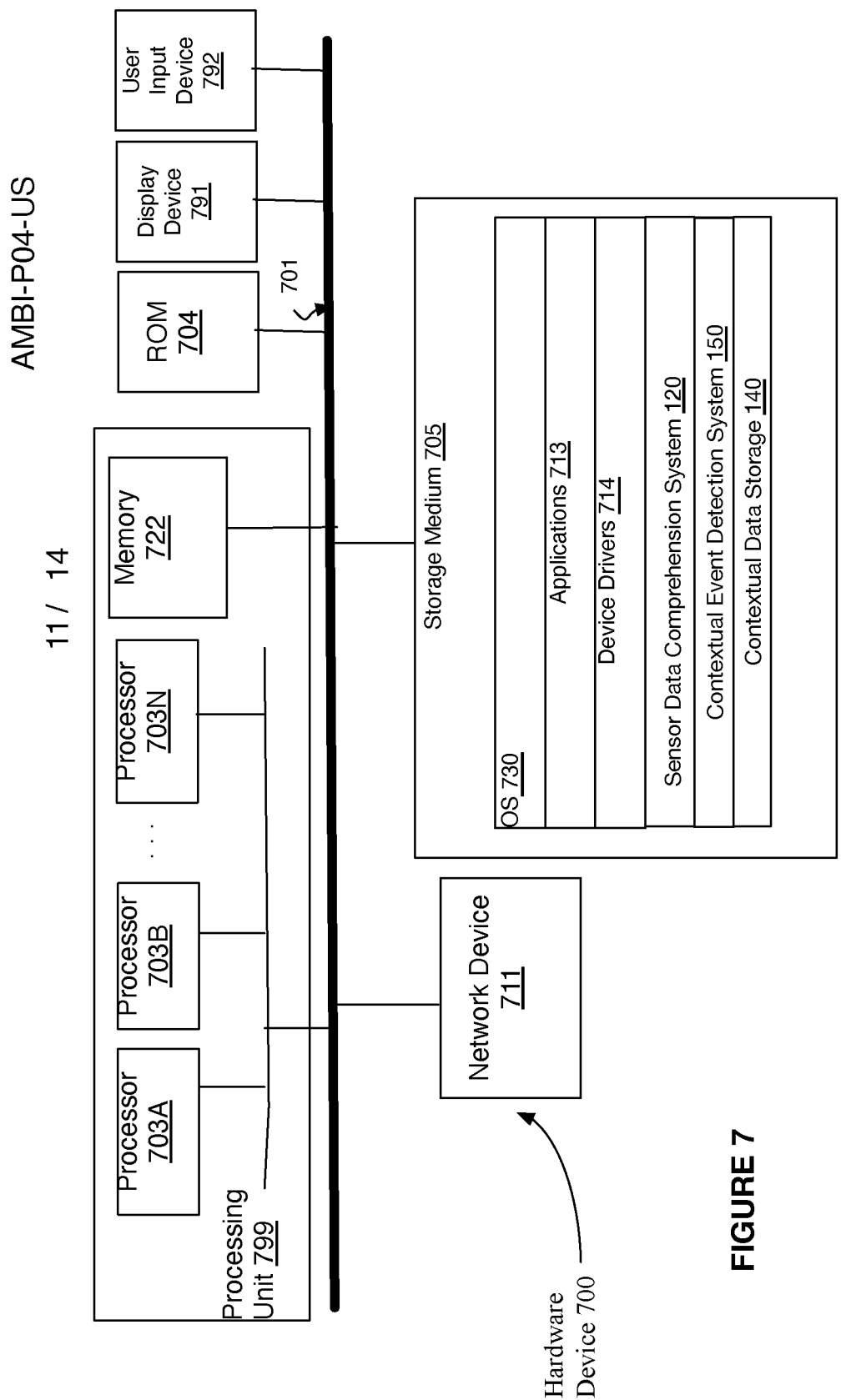
FIG. 7 illustrates a schematic of a system, in accordance with embodiments.

In some implementations, the comprehension system 120 is implemented by one or more computing servers (e.g., 700 shown in FIG. 7) having one or more computer processors (e.g., graphics processor units (GPU), tensor processing unit (TPU), central processing units (CPUs, MCUs, etc.), or a combination of web servers and private servers) that may function to implement one or more ensembles of machine learning models. In some implementatiyons, the comprehension system 120 is implemented by at least one hardware device 700, as shown in FIG. 7. In some embodiments, a storage medium (e.g., 705) of the comprehension system includes at least one of machine-executable instructions and corresponding data for at least one of a high-level feature detection model 121, a multi-feature detection machine learning ensemble 122, a condenser 123, a data exploitation engine 124, a scene story generator 126, and a trained language machine learning model 127.

In some variations, the ensemble 122 of machine learning models includes multiple machine learning models that work together to exploit mutual information to provide accurate and useful feature detection and relationship vectors therefor. In some implementations, the comprehension system 120 functions to communicate via one or more wired or wireless communication networks. In some implementations, the comprehension system 120 utilizes input from various other data sources (e.g., outputs of system 100, system 100 derived knowledge data, external entity-maintained data, etc.) to continuously improve or accurately tune weightings associated with features of the one or more of the machine learning models 122 and/or 121 of the comprehension system 120.

In some implementations, the comprehension system 120 performs any suitable machine learning process, including one or more of: supervised learning (e.g., using logistic regression, back propagation neural networks, random forests, decision trees, etc.), unsupervised learning (e.g., using an Apriori algorithm, k-means clustering, etc.), semi-supervised learning, reinforcement learning (e.g., using a Q-learning algorithm, temporal difference learning, etc.), and any other suitable learning style. Each module of the plurality can implement any one or more of: a regression algorithm (e.g., ordinary least squares, logistic regression, stepwise regression, multivariate adaptive regression splines, locally estimated scatterplot smoothing, etc.), an instance-based method (e.g., k-nearest neighbor, learning vector quantization, self-organizing map, etc.), a regularization method (e.g., ridge regression, least absolute shrinkage and selection operator, elastic net, etc.), a decision tree learning method (e.g., classification and regression tree, iterative dichotomiser 3, C4.5, chi-squared automatic interaction detection, decision stump, random forest, multivariate adaptive regression splines, gradient boosting machines, etc.), a Bayesian method (e.g., naïve Bayes, averaged one-dependence estimators, Bayesian belief network, etc.), a kernel method (e.g., a support vector machine, a radial basis function, a linear discriminant analysis, etc.), a clustering method (e.g., k-means clustering, expectation maximization, etc.), an associated rule learning algorithm (e.g., an Apriori algorithm, an Eclat algorithm, etc.), an artificial neural network model (e.g., a Perceptron method, a back-propagation method, a Hopfield network method, a self-organizing map method, a learning vector quantization method, etc.), a deep learning algorithm (e.g., a restricted Boltzmann machine, a deep belief network method, a convolutional network method, a stacked auto-encoder method, etc.), a dimensionality reduction method (e.g., principal component analysis, partial least squares regression, Sammon mapping, multidimensional scaling, projection pursuit, etc.), an ensemble method (e.g., boosting, bootstrapped aggregation, AdaBoost, stacked generalization, gradient boosting machine method, random forest method, etc.), and any suitable form of machine learning algorithm. Each processing portion of the system 120 can additionally or alternatively leverage: a probabilistic module, heuristic module, deterministic module, or any other suitable module leveraging any other suitable computation method, machine learning method or combination thereof. However, any suitable machine learning approach can otherwise be incorporated in the system 120. Further, any suitable model (e.g., machine learning, non-machine learning, etc.) can be used in generating scene comprehension data via system 120.

In some variations, the comprehension system 120 functions to process accessed sensor data to generate one or more semantic primitives describing the accessed sensor data processed by the comprehension system 120. In some implementations, the high-level deep learning model 121 processes the accessed sensor data to extract the high-level features from the sensor data accessed by the comprehension system 120, and the multi-feature detection machine learning ensemble 122 processes the high-level features to generate the one or more semantic primitives describing the accessed sensor data processed by the comprehension system 120. By virtue of the ensemble 122 processing the high-level features rather than the accessed sensor data, generation of the one-or-more semantic primitives can be performed in real-time. In some variations, the semantic primitives identify at least one of the following for the accessed sensor data: an activity, an object (e.g., person, car, box, backpack), a handheld object (e.g., knife, firearm, cellphone), a human-object interaction (e.g., holding, riding, opening), a scene element (e.g., fence, door, wall, zone), a human-scene interaction (e.g., loitering, falling, crowding), an object states (e.g., (door open"), and an object attribute (e.g., "red car").

In some variations, the comprehension system 120 functions to store sensor data in a sensor data storage (e.g., 128). In some variations, the stored sensor data includes at least one of sensor data received by the comprehension system 120 and primitives describing sensor data processed by the comprehension system 120.

In some variations, the system 100 includes a contextual data storage (e.g., 140) that stores contextual data. In some variations, the contextual data includes contextual data for at least one region of a site (e.g., a building, campus, etc.).

In some variations, the user interface system 130 functions to receive outputs from the comprehension system 120 as well as from the one or more sensor data sources (e.g., 110a-c). In some variations, the user interface system 130 functions to present sensor data from the one or more sensor data sources together with a scene description or scene story of the sensor data. In some variations, a scene description is presented by the user interface system 130 only when an event of interest (e.g., a predetermined event type, etc.) is detected within a scene. Accordingly, based on the detection of the event or circumstance, the system 130 may function to generate a scene description and/or scene story to detail the event or circumstance. In some implementations, the sensor data includes video data and the scene description or scene story may be superimposed over or augmented to the video data via a display of the user interface system 130, such that the scene description is presented at a same time as a video basis of the scene description. Additionally, or alternatively, the scene description or scene story may be presented in any suitable manner by the user interface system 130, including visually, audibly, haptically, and the like.

In some variations, the user interface system 130 includes one or more computers having input/output systems including one or more of displays (e.g., video monitors), keyboards, mice, speakers, microphones, and the like. In some variations, the user interface system 130 includes a communication interface that enables the user interface system 130 to communicate over a communication network (e.g., the Internet) with the other components of system 100.

In some variations, the contextual event detection system 150 functions to implement a threat model.

In some implementations, a threat model is templatized and immediately deployed to another site of the same type. For example, a threat model generated for a first Corporate Office can be templatized and immediately deployed at a contextual event detection system for a second Corporate Office.

In some variations, a threat model is a collection of threat signatures configured to protect a site. In some variations, a threat signature (included in a threat model) is a combination (e.g., an arbitrary combination) of semantic primitives and contextual factors that represents a threat to be detected.

In some implementations, semantic primitives are basic entities in metadata generated by the comprehension system 120.

In some variations, contextual factors include factors that identify time of the day, a region (e.g., "stairwell", "parking lot", "office", "kitchen", etc.) of a site, known individuals, unknown individuals, and the like. In some implementations, contextual factors for the site are stored in the contextual data storage 140.

In some variations, the contextual event detection system 150 detects the presence of threat signatures (included in a threat model being used by the contextual event detection system 150) in data received from at least one of the sensor data comprehension system 120 (semantic primitives), a sensor data source (e.g., 110a-c) (raw sensor data), sensor data storage 128 (raw sensor data), and contextual data storage 140 (contextual factors). In some variations, the contextual event detection system 150 raises alerts in response to detection of a threat signature.

In some variations, the contextual event detection system 150 functions to perform at least one of: generating the threat model, accessing contextual data, accessing access data generated by the sensor data comprehension system (e.g., 120), identifying contextual events, classifying contextual events as either threats or non-threats by using the threat model.

In some variations, generating the threat model includes generating one or more threat signatures. In some variations, generating the threat model includes adding one or more threat signatures to the threat model.

In some variations, at least one contextual event is an event generated by processing sensor data (e.g., generated by a sensor data source, 110*a-c*) with contextual data (e.g., stored by the contextual data storage 140). In some variations, at least one contextual event identifies an interaction between at least two entities (e.g., objects, persons, etc.) (and identifies the at least two entities). In some variations, at least one contextual event identifies an interaction between at least two entities (e.g., objects, persons, etc.) (and identifies the at least two entities) and identifies at least one context identifier.

In some variations, at least one contextual event is identified by transforming at least one semantic primitive generated by the sensor data comprehension system 120 into a contextualized semantic primitive by using the contextual data, such that the contextual event identifies at least one contextualized primitive. For example, the contextual event detection system 150 can replace a semantic primitive "door" (generated by the sensor data comprehension system 120) with the contextualized semantic primitive "building entrance" by using contextual data that identifies the door as a building entrance. Accordingly, the interaction "person entering door" can be transformed to "person entering building", which distinguishes the door from a door within the building (e.g., an office door). As another example, the interaction "person entering door" can be transformed to "person entering kitchen". Other examples can be envisioned in which semantic primitives generated by the sensor data comprehension system 120 are transformed into at least one contextualized semantic primitive by using the contextual data.

In some variations, the contextual event detection system 150 functions to perform at least one action responsive to classification of an identified contextual event as a threat. In some implementations, the data generated by the sensor data comprehension system includes semantic primitives (as described herein). In some implementations, the contextual event detection system 50 accesses the data generated by the sensor data comprehension system 120 from the sensor data comprehension system 120; alternatively, or additionally, the detection system 50 accesses the data generated by the sensor data comprehension system 120 from a sensor data storage (e.g., 128). In some variations, the contextual event detection system 50 accesses the contextual data from a contextual data storage (e.g., 140).

In some variations, the contextual event detection system 150 functions to store data identifying contextual events identified by the event detection system 150 in a contextual event storage (e.g., 152).

In some variations, the contextual event detection system 150 includes at least one threat model (e.g., 151).

In some variations, the control system 160 functions to: control at least one system to perform an action (e.g., a threat response operation) responsive to detection of a threat.

In some variations, the notification system 170 functions to: generate at least alert responsive to detection of a threat, and optionally provide the alert to a system (e.g., a user device, the user interface system 130, etc.).

In some implementations, the contextual event detection system 150 is implemented by one or more computing servers having one or more computer processors (e.g., graphics processor units (GPU), tensor processing unit (TPU), central processing units (CPUs, MCUs, etc.), or a combination of web servers and private servers) that may function to implement one or more ensembles of machine learning models. In some implementations, the contextual event detection system 150 and the comprehension system 120 are implemented in a same computing server; alternatively, the contextual event detection system 150 and the comprehension system 120 are implemented in separate computing servers. In some embodiments, the contextual event detection system 150 is implemented by at least one hardware device 700, as shown in FIG. 7. In some embodiments, a storage medium (e.g., 705) of the comprehension system includes at least one of machine-executable instructions and corresponding data for at least one of: threat model (e.g., 151), the sensor data storage (e.g., 128), the contextual data storage (e.g., 140), the contextual event storage (e.g., 152), the control system (e.g., 160), the notification system (e.g., 170), and the user interface system (e.g., 130).

2. Method

Figure 2A:
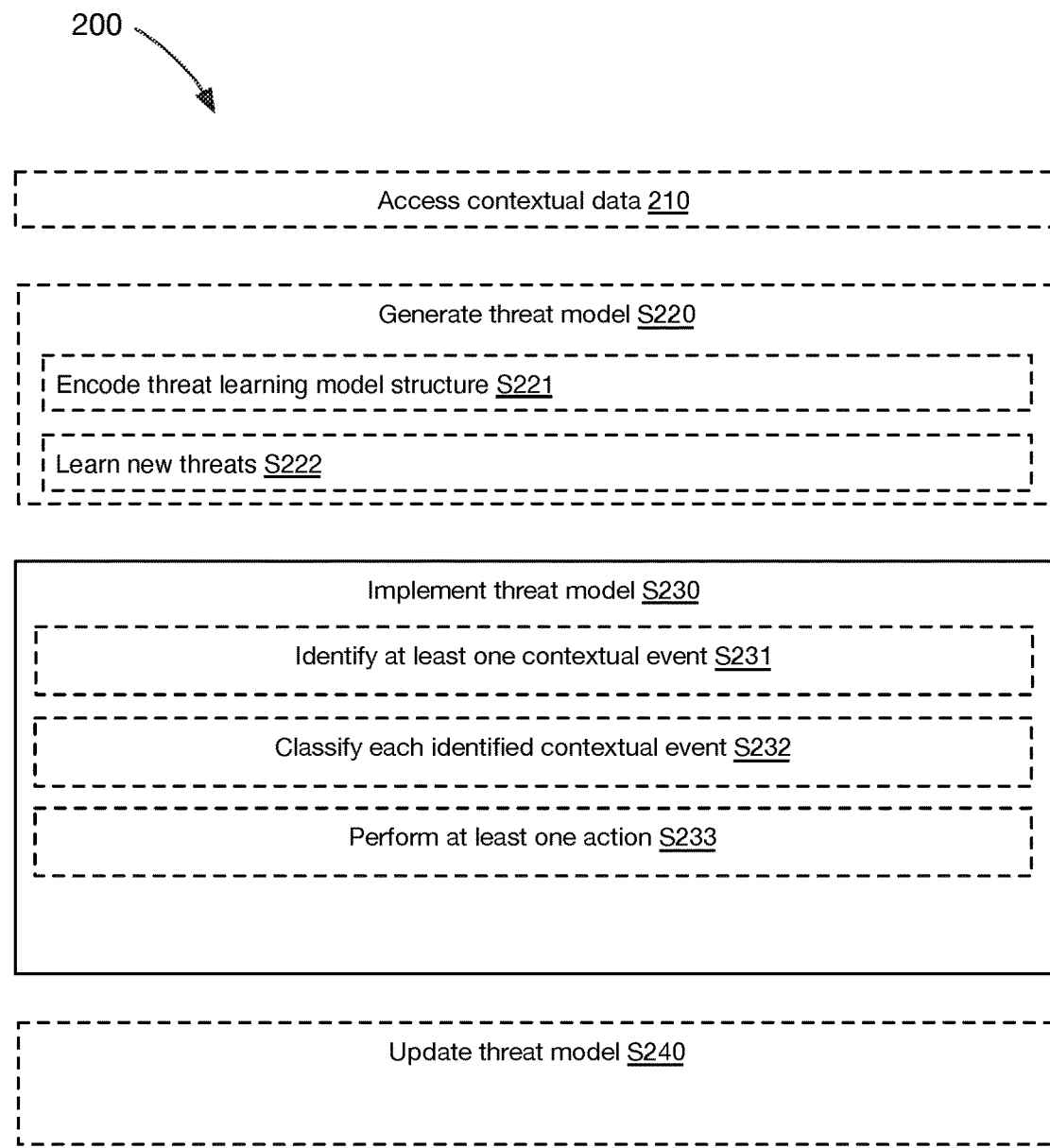
FIGS. 2A-B illustrate a method, in accordance with embodiments.
Figure 2B:
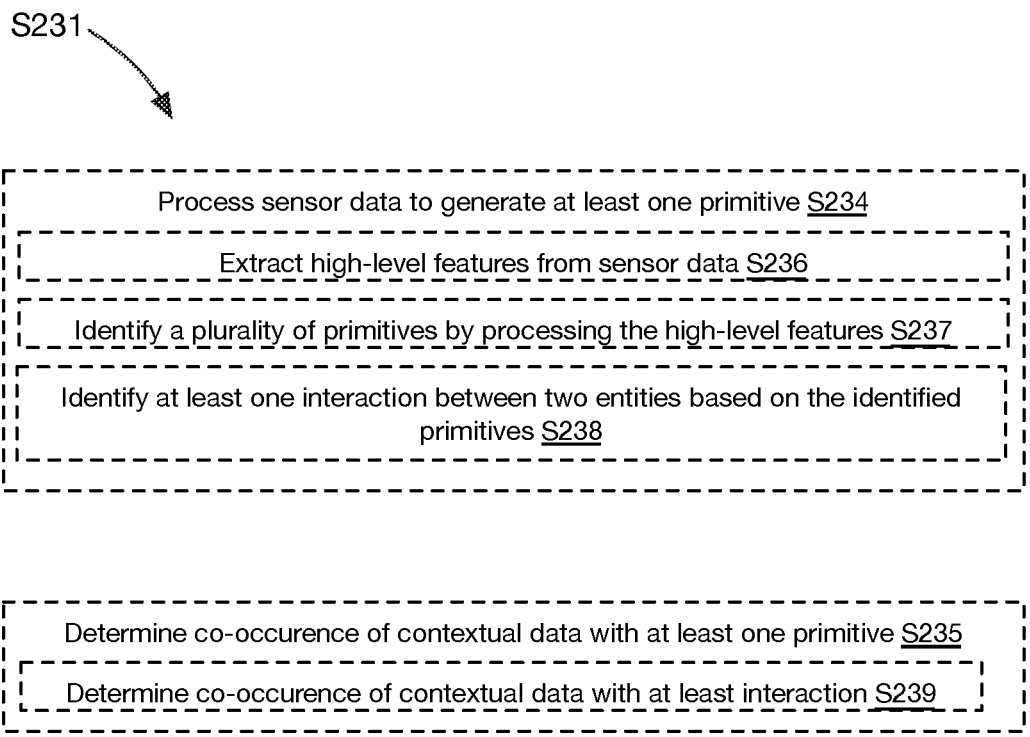

As shown in FIGS. 2A-B, a method 200 includes at least one of: accessing contextual data (S210); generating at least one threat model (S220); implementing at least one threat model (S230); and updating at least one threat model (S240).

Figure 8A:
FIGS. 8A-C illustrate threat models, in accordance with embodiments.
Figure 8B:
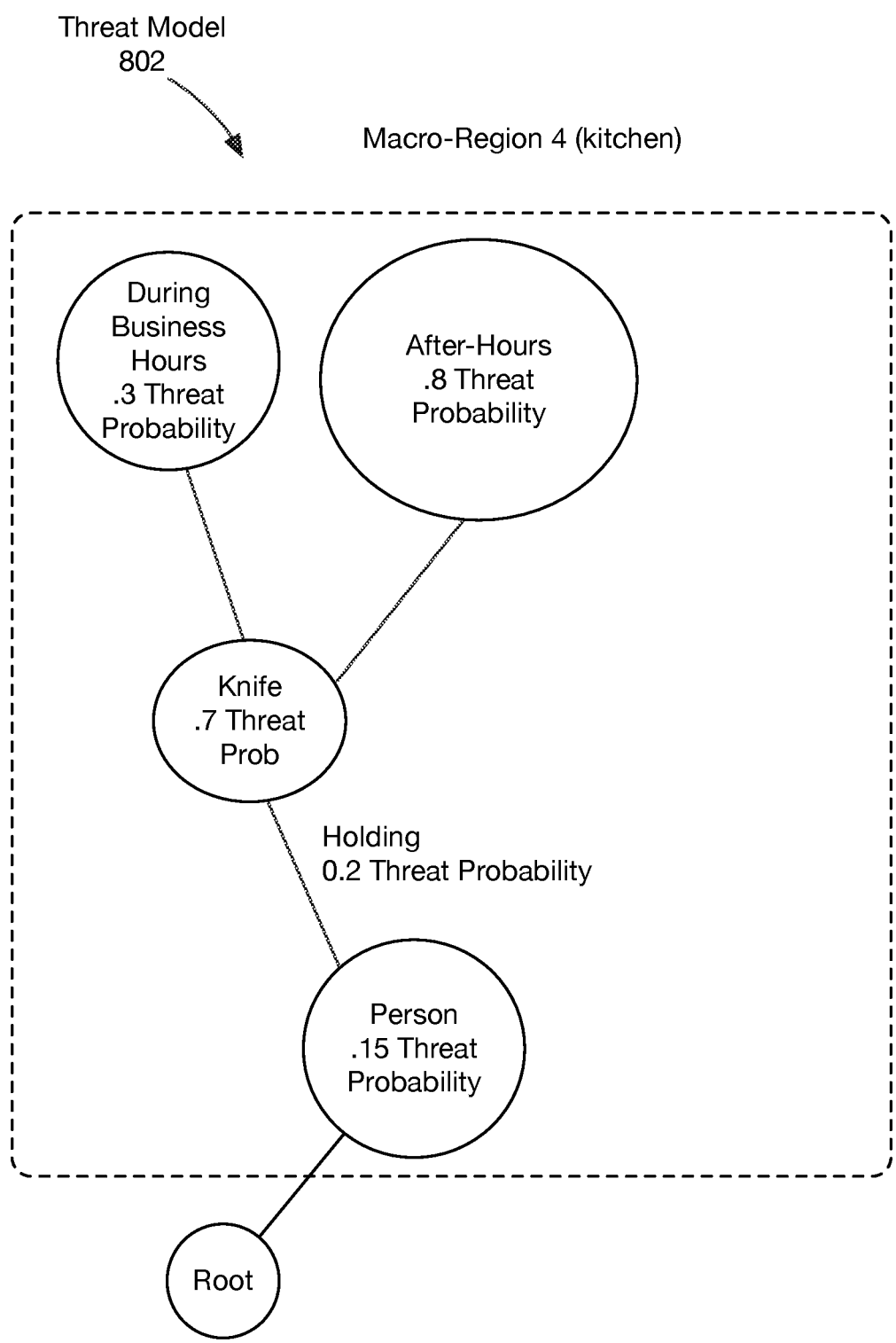
Figure 8C:
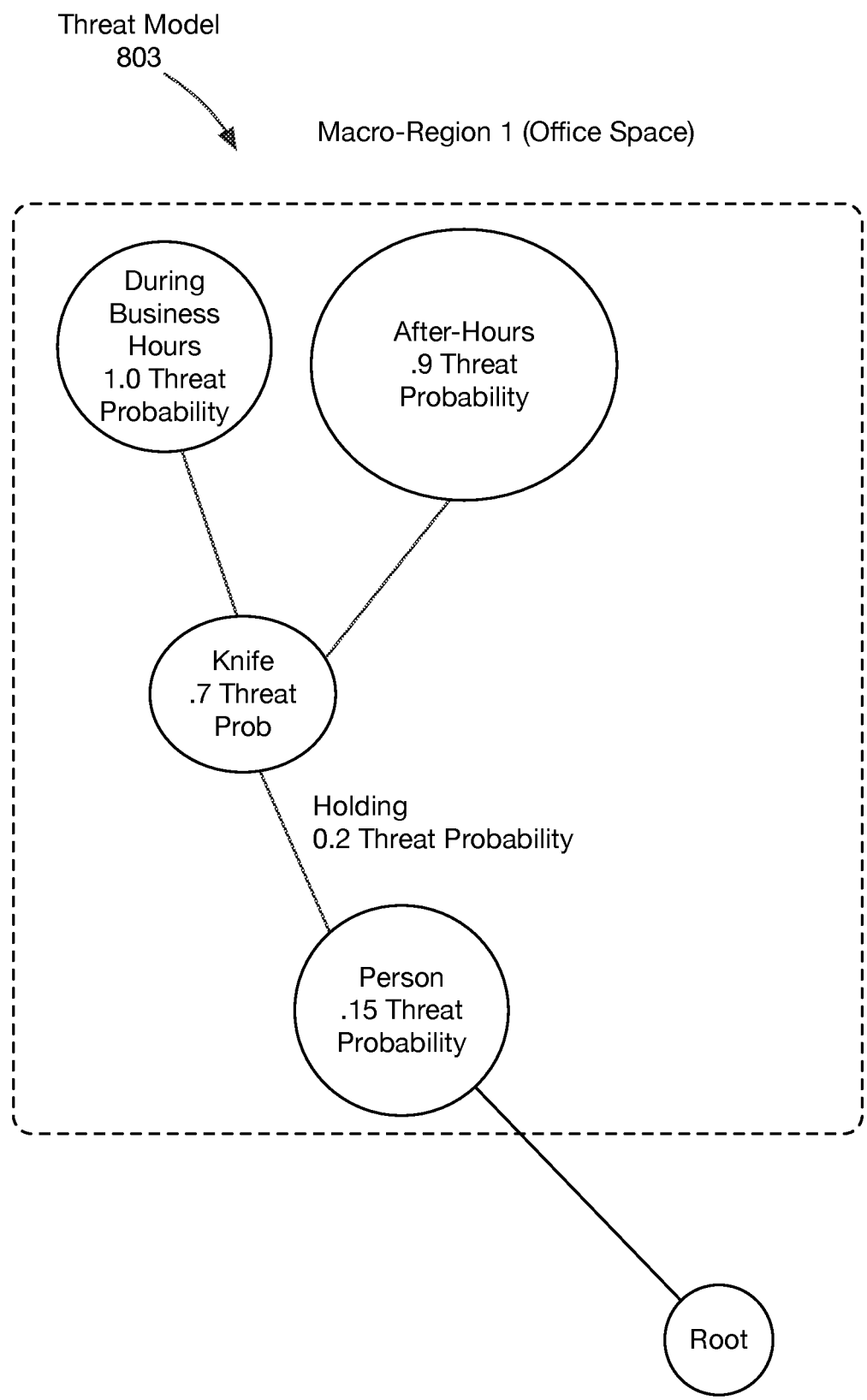

In some variations, the threat model is generated based on site activity data of a subject site; however, once generated, the threat model may be transferred to and implemented with any similar or comparable subject site for immediate threat detection and/or anomaly detection. FIGS. 8A-C show exemplary threat models.

S210 functions to access contextual data for one or more regions of a subject site (e.g., "stairwell", "parking lot", etc.). In some variations, the subject site includes a plurality of regions.

S220 functions to generate at least one threat model that can be used to identify contextual events as threats. In some variations, the threat model identifies a threat probability (probabilistic threat value) for at least one contextual event identified in the threat model. For some contextual events identified in the threat model, the probability is 100%, indicating that the event is always a threat (e.g., "person holding gun"). For other contextual events identified in the threat model, the probability can be less than 100%, indicating that the event might be a threat (e.g., "person holding knife in kitchen"). For example, a person holding a knife in a kitchen might be a cook using the knife to cook, or an attacker using the knife as a weapon, therefore, a probability of less than 100% may be assigned to this contextual event to indicate the possibility that this event might not be a threat.

S220 can include at least one of: encoding a threat learning model structure S221, and learning new threats S222.

In some variations, S221 includes adding contextual events to the threat model based on user input received via a user interface (e.g., 130).

In some variations, S222 includes automatically adding new contextual events to the threat model. In some implementations, a machine learning process is performed to automatically classify contextual events as threats based on historical data (e.g., frequency of occurrence, user feedback, detection of threat responses in connection with a contextual event, detection of ignored alerts in connection with a contextual event, etc.). In some implementations, a machine learning process is used to automatically classify events as threats based on historical data. In some implementations, the machine learning process is an unsupervised learning process. In some implementations, the machine learning process is a machine learning classifier process.

S230 can include at least one of identifying at least one contextual event S231; classifying at least one identified contextual event S232; and performing at least one action S233.

S231 functions to identify at least one contextual event based on sensor data and contextual data. In some variations, S231 functions to simultaneously identify a plurality of contextual events in real-time based on sensor data and contextual data. In some implementations, a plurality of contextual events are simultaneously identified within a same region of the site in real-time. In some implementations, a plurality of contextual events are simultaneously identified across a plurality of regions of the site in real-time.

In some variations, S231 includes identifying at least one contextual event for a site in real-time by processing: sensor data generated by a plurality of sensor data sources (e.g., 110a-c) arranged at locations within a plurality of regions of the site; and contextual data for at least one of the regions.

S231 can include at least one of: processing sensor data to generate at least one primitive S234; and determining co-occurrence of contextual data with at least one primitive S235.

In some variations, S234 functions to generate at least one primitive by using the sensor data comprehension system 120 to process sensor data accessed from at least one sensor data source (e.g., 110a-c).

S234 can include at least one of: extracting high-level feature values from sensor data S236; identifying a plurality of semantic primitives by processing the high-level feature values S237; and identifying at least one interaction between two entities based on the identified primitives S238.

In some variations, the high-level feature detection model 121 (e.g., shown in FIG. 1B) performs S236. In some variations, the ensemble 122 performs S237. In some variations, the ensemble 122 performs at least a portion of S238. In some variations, the condenser 123 performs at least a portion of S238. In some variations, the scene story generator 126 performs at least a portion of S238. In some implementations, the high-level feature values are represented as a high-level feature vector that includes a feature value for each feature. In some variations, the ensemble 122 performs S237 by receiving only the high-level feature values as input and generating semantic primitives by using only the high-level feature values, without processing the raw sensor data.

In some variations, S235 functions to determine co-occurrence of contextual data with at least one semantic primitive, and transform the at least one semantic primitive into a contextualized semantic primitive by using the co-occurring contextual data.

S235 can include determining co-occurrence of contextual data with at least one interaction S239. In some implementations, S239 includes determining contextual data related to at least one interaction based on at least one of time, region, and location within a region. As an example, the interaction "person entering door" can be associated with sensor data generated by a sensor data source (e.g., 110a-c) at a particular location within the site, contextual data related to the location can be accessed, and the interaction can be transformed to "person entering building" by using the contextual data, which identifies the door at the location as being a building entrance. As an example, the interaction "person entering door" can be associated with sensor data generated by a sensor data source (e.g., 110a-c) at a particular time, contextual data related to the time can be accessed, and the interaction can be transformed to "person entering door after work hours" by using the contextual data, which identifies the time as being after work hours.

S232 can include: using at least one threat model (e.g., 151) to classify at least one identified contextual event as one of a threat and a non-threat.

In some variations, S233 functions to perform at least one action responsive to classification of an identified contextual event as a threat.

S233 can include at least one of generating an alert and performing a threat response operation. In some implementations, S233 includes the notification system 170 generating an alert. In some implementations, S233 includes the notification system 170 performing a threat response operation (e.g., dispatching emergency response services, broadcast emergency response instructions, etc.). In some implementations, S233 includes the control system 160 performing a threat response operation (e.g., enable fire sprinkler system, lock down building by controlling building access control systems, disabling elevators, etc.).

In some variations, S240 functions to update at least one threat model by performing at least one of: adding a new contextualized event to the threat model, removing a contextualized event from the threat model, and updating a threat probability of at least one contextualized event identified in the threat model.

In some variations, S240 includes updating the threat model based on user input received via a user interface (e.g., 130).

In some variations, S240 includes automatically updating the threat model. In some implementations, a machine learning process is performed to automatically update the threat model based on historical data (e.g., frequency of occurrence of contextual events, user feedback, detection of threat responses in connection with a contextual event, etc.). In some implementations, a machine learning process is used to automatically update the threat model based on historical data. In some implementations, the machine learning process is an unsupervised learning process. In some implementations, the machine learning process is a machine learning classifier process. In some implementations, S240 includes automatically adding new contextual events to the threat model by performing a process similar to S222.

2.1 Threat Context Factors & Feature Extraction

In some variations, S210 includes accessing contextual data that identifies contextual factors relating to site activity that indicate a probability of a threat and/or a probability of a non-threat. In some variations, S210 functions to identify a plurality of contextual factors from one or more types of sensor data (e.g., surveillance data) (e.g., video image data) of a subject site and extract features (e.g., by using the context feature extractor 152) associated with the plurality of contextual factors. The contextual factors preferably relate to features found in sensor data (e.g., generated by a sensor data source, 110a-c) and/or in recorded media (e.g., data stored in sensor data storage sensor data storage 128) that may indicate a likelihood and/or a probability of a threat or non-threat at a given site based on one or more activities detected (e.g., by the sensor data comprehension system 120) within one or more regions of the site.

In some variations, contextual factors are used to generate one or more of a coarse threat modeling structure (or template) and a threat inference. The subject site may be any type or given site-type that is monitored and/or under surveillance, including but not limited to, a facility and/or building, a defined area or defined space, a region or sub-region, and/or the like. In some variations, the subject site includes a plurality of distinct macro regions, which may relate to a distinct sub-region within the subject site in which varying activities may take place and/or may be monitored by a sensor system, such as a surveillance system, and the like.

In some variations, contextual factors are collected or derived from an owned surveillance system and/or a surveillance system of a security service. In some variations, contextual factors are collected and/or derived in any suitable manner including, but not limited to, based on third-party data and/or crowdsourced, engineered scenarios, contextual data from a collection of disparate sites, and/or the like.

In some variations, S210 functions to apply one or more feature extraction methods (e.g., by using the sensor data comprehension system 120) to the sensor data (e.g., generated by a sensor data source, 110a-c) of a given site. In some variations, S210 functions to implement a threat feature extractor (e.g., 153) that extracts, from the sensor data, threat and non-threat features. In some variations, S210 functions to implement a context feature extractor (e.g., 152) that extracts, from the sensor data, threat and non-threat features.

In some implementations, the context feature extractor (e.g., 152) includes a machine learning model that is trained to classify a plurality of distinct contextual features from sensor data. For example, a feature extractor may include a trained machine learning classifier that operates to extract features from video data relating to a detected activity within a site under surveillance including, a time of day (or period) of the detected activity, one or more entities involved in the detected activity (e.g., objects, people, etc.), a macro region (e.g., activity location within the site), and the activity type, per se.

In some implementations, the context feature extractor (e.g., 152) includes an ensemble of distinct machine learning classifiers that are each specifically trained to detect one or more distinct contextual factors or features from sensor data. For example, the feature extractor in such implementation may include a first, second, and third distinct machine learning classifier that respectively detected feature_type_1 (e.g., macro region), feature_type_2 (e.g., activity type), and feature_type_3 (e.g., entity type), etc.

It shall be noted while in one or more preferred embodiments, S210 may function to implement a context feature extractor (e.g., 152) with one or more trained machine learning models, S210 may function to mine or extract (contextual) features from sensor data using any suitable method technique, method, and/or system, including, but not limited to, applying one or more distinct feature filters and/or the like. Similarly, it shall be noted while in one or more preferred embodiments, S210 may function to implement a threat feature extractor (e.g., 153) with one or more trained machine learning models, S210 may function to mine or extract (threat) features from sensor data using any suitable method technique, method, and/or system, including, but not limited to, applying one or more distinct feature filters and/or the like.

Figure 3:
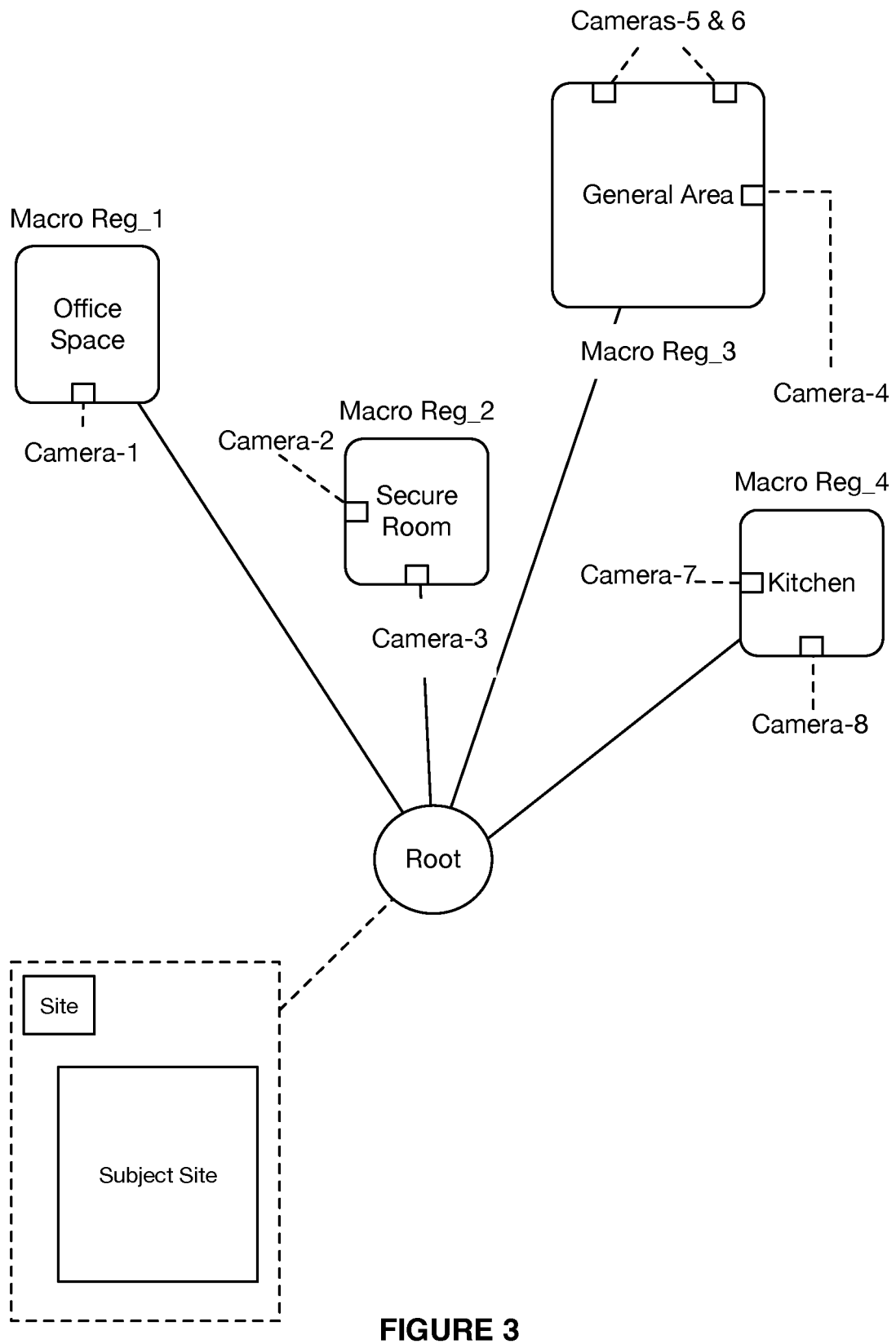
FIG. 3 illustrates a schematic of a site graph, in accordance with embodiments.

2.2 Configuring and Encoding Graphical Threat Model Structures 2.2.1 Macro Regions and Site Graph Construction/Encoding In some variations, S221 includes configuring and encoding a threat learning model structure. In some implementations, the threat learning model structure is represented as a matrix. In some implementations, the threat learning model structure is represented as knowledge graph. In some variations, S221 functions to construct or generate a site graph (e.g., a layout or the like) representing an architecture or configuration of a specific site, as shown by way of example in FIG. 3. In some variations, a site graph includes an identification and/or a coarse indication of the locations of plurality of distinct macro regions of a specific site. That is, the site graph may function to illustrate graphically a general configuration of a subject site together with the respective locations of the plurality of distinct macro regions that define various sections of the subject site that may be expected to have various levels of site activity.

In some variations, S220 functions to additionally encode within the site graph an identification (sensor identification data) of and/or positioning (sensor positioning data) and configuration (sensor configuration data) of each of one or more sensor data sources (e.g., 110a-c) (e.g., video cameras or the like) that operate to monitor and/or obtain activity data within each of the plurality of distinct macro regions of a subject site. The sensor identification data preferably relates to a distinct identification value associated with each of one or more sensor data sources (e.g., 110a-c) located within a distinct macro region. The sensor positioning data preferably relates to a two-dimensional or three-dimensional coordinate or position of each of the one or more sensor data sources within each distinct macro region of a given site. The sensor configuration data preferably relates to the configuration of the field-of-sensing for each of the one or more sensor data sources within a distinct macro region. That is, the sensor configuration data may function to indicate sensing capabilities of a given sensor data source. In some implementations, sensing capabilities include at least one of: direction of sensing, extent of sensing, type of sensing (e.g., image sensing, heat sensing, movement sensing, acoustic sensing, etc.), and the like.

In some variations, S221 functions to encode a first macro region of a site graph with identification, configuration, and positioning data for each of a first and a second sensor data source (e.g., 110a-c) located within the macro region. Additionally, or alternatively, the site graph may include an identification of one or more access points (e.g., building access points, premises access points, etc.) preferably associated with the plurality of distinct macro regions of the subject specific site.

In some variations, S221 functions to identify probabilistic threat values for each macro region of a subject site and further, encode the site graph of the subject site with the identified probabilistic threat values. In some variations, the probabilistic threat values preferably indicate the likelihood that activity that may occur in a given macro region or the like of a site may involve a threat. For instance, in a hallway of a given site, S221 may function to identify a threat value that is low (or falls below a predetermined threshold), such as 0.05 on a scale from 0 to 1 where 1 is a certain threat and 0 is no threat. Comparatively, S221 may function to identify a threat value that is high (or exceeds a predetermined threat threshold), such as 0.60 on a same or similar scale as discussed above, for a macro region that encompasses a secure room (e.g., a secure server room, etc.). The probabilistic threat values assigned to each macro region may be based on historical data and/or generated using one or more threat inference machine learning models. In some implementations, the historical data indicates at least one of: threats detected in at least one region; and threat responses related to at least one region.

2.2.2 Semantic Primitives and Semantic Graph Construction/Encoding

In some variations, S221 includes: identifying, within a subject site, semantic primitives and constructing a semantic graph based on the identified semantic primitives.

In some implementations, the semantic graph is represented as a matrix. In some implementations, the semantic graph is represented as a knowledge graph. In some variations, at least one semantic primitive (as defined herein) relates to a macro region of a given site. In some variations, S221 functions to encode at least one semantic primitive within a threat model structure. In some implementations, S221 functions to encode at least one semantic primitive within a semantic graph for a subject site. In some implementations, the semantic graph associates each encoded primitive with a macro region for which the semantic primitive was detected or identified. For example, if an object was detected by using sensor data from a sensor data source (e.g., 110a-c) located in a first region, then the semantic graph associates the detected object (which is represented as a semantic primitive) with the first region.

In some variations, S221 includes structurally encoding at least some of the semantic primitives (e.g., primitives representing people or objects) associated with at least a portion of a region as graph nodes for the region of the site, and encoding at least some of the semantic primitives (e.g., primitives representing actions, interactions, etc.) as edges between related graph nodes (e.g., a root node, a node representing a primitive).

Figure 4:
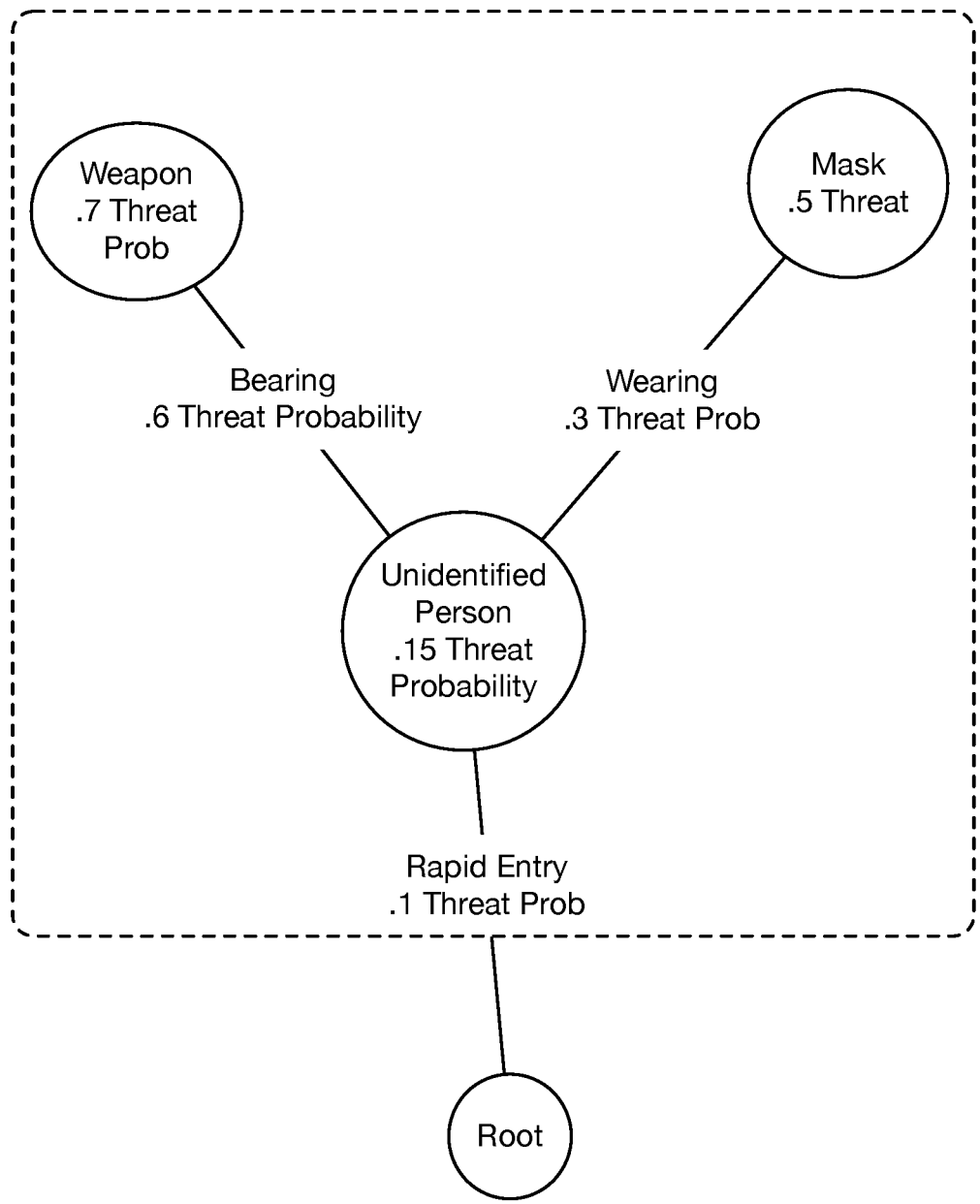
FIG. 4 illustrates a schematic of a semantic graph, in accordance with embodiments.

As shown in FIG. 4, a graph (or sub-graph) representing a portion of a region sensed by Camera-3 includes a root node, and a node for each of three detected entities ("Unidentified Person", "Weapon", and "Mask"). An edge labeled "Rapid Entry" connects the Root node and the "Unidentified Person" node to identify an unidentified person rapidly entering the region sensed by Camera-3. An edge labeled "Bearing" connects the "Unidentified Person" node with the "Weapon" node to identify an unidentified person bearing a weapon within the region sensed by Camera-3. An edge labeled "Wearing" connects the "Unidentified Person" node with the "Mask" node to identify an unidentified person wearing a mask within the region sensed by Camera-3.

In some variations, S221 includes representing (and optionally displaying, e.g., via a user interface displayed by a display device) each of an actor and/or an object within an observed scene and/or within sensor data as a graphical node within the semantic graph thereby indicating a distinct or an independent element existing or operating within the observed scene and/or within the sensor data. In one example, if a masked person walks into a door of a macro region of a site under surveillance, each of the mask, the person, and the door may be considered semantic primitives and represented as distinct graph nodes within a threat model structure.

In some variations, S221 includes representing (and optionally displaying, e.g., via a user interface displayed by a display device) an activity and/or activities observed within a macro region of a site as one or more graph edges that operate to connect pairs of distinct graph nodes within the semantic graph. The one or more graph edges representing the activities within a scene preferably function as a connective element that describe a manner in which the graph nodes may be interacting with each other. Referring back to the most recent example in which a masked person travels through in door, in such example the masked person may have forcibly acted on the door by ramming the door. Accordingly, S221 may function to encode the activity of ramming as a graph edge between the person and the door indicating that there is an interaction between the two graph nodes. Similarly, S221 may function to encode the arrangement of the mask as a graph edge that connects the mask node and the person node.

Further, while demonstrated in the above example but not expressly perceptible as an object or actor within a scene, a force involved in the ramming to forcibly open the door by a person may additionally be represented as a graph node independent of the graph edge representing the activity of ramming within the scene. In such instances, a force used in an observed scene or the like may also be recognized as a semantic primitive and illustrated as a graph node.

Additionally, or alternatively, some identified states of an actor and/or object within an observed scene may be represented as a graph edge. For instance, a person lying down may be interpreted by S221 such that the person is encoded as a graph node and lying down as a state encoded as a graph edge. In some implementations, a state of a node may in some implementations be encoded by S221 as an annotation to the graph node to which the state applies. In one example, a state of lying down may be annotated to or proximate to a person node to which the state applies.

It shall be noted that while the semantic primitive data may preferably be encoded to a site graph or the like of a subject site, the method 200 may additionally or alternatively encode semantic primitive data to disparate and independent graphs representing learnings from a specific site or a certain site type. In some embodiments, the graph may be used as a training input for training a machine learning model and/or the like.

Additionally, or alternatively, 221 may function to identify probabilistic threat values for each of the identified semantic primitives of a semantic graph and further, encode the semantic graph with probabilistic threat value data. Thus, in a preferred embodiment, for each semantic primitive identified within a semantic graph, S221 may function to assign a probabilistic threat value indicating a likelihood of threat associated with the specific semantic probability. That is, S221 may function to encode each semantic graph node and semantic graph edge of a semantic graph with probabilistic threat value data.

2.3 Constructing an Integrated Machine Learning-Based Threat Model

In some variations, S221 includes constructing a threat model for computing threat inferences.

In some implementations, the threat model identifies at least one contextual event that is classified as a threat. In some implementations, the threat model assigns a probabilistic threat value to at least one contextual event that is classified as a threat by the threat model.

FIG. 8A shows an exemplary threat model 801 that identifies contextual events classified as threats and corresponding probabilistic threat values. As shown in FIG. 8A, the contextual event "Person holding knife in kitchen during business hours" is assigned a probabilistic threat value of 30%, whereas the contextual event "Person holding knife in kitchen after business hours" is assigned a probabilistic threat value of 80%.

In some variations, the threat model is implemented as a graph structure. In some implementations, the graph structure is represented as a matrix. In some implementations, the graph structure is represented as a knowledge graph. In some implementations, the arrangement of nodes and edges in the threat model indicate relative locations within the site (or relative locations within a region of the site). FIGS. 8B and 8C represent portions of a threat model implemented as a graph structure, with FIG. 8B relating to a first region of the site and FIG. 8C relating to a second region of the site. As shown in FIGS. 8B and 8C, the locations of the graph nodes are arranged to represent relative locations with respect to a root node that represents a root location of the site. The nodes shown in FIG. 8B are arranged to the right of the root node, whereas the nodes shown in FIG. 8C are arranged to the left of the root node, which indicates the relative locations of the region represented in FIG. 8B with respect to the region represented in FIG. 8C.

FIG. 8B shows an exemplary threat model 802 that identifies contextual events classified as threats and corresponding probabilistic threat values for a first region (e.g., Kitchen) of the site. As shown in FIG. 8B, the threat model 802 is represented as a graph for a region (Region 4—"Kitchen") that identifies semantic primitives (e.g., "Person", "Holding", "Knife") as well as contextual data (e.g., "Kitchen", "During Business Hours", "After-Hours"). As shown in FIG. 8B, probabilistic threat values are assigned to nodes and edges of the graph. As shown in FIG. 8B, the contextual event "Person holding knife in kitchen during business hours" is assigned a probabilistic threat value of 30%, whereas the contextual event "Person holding knife in kitchen after business hours" is assigned a probabilistic threat value of 80%.

FIG. 8C shows an exemplary threat model 803 that identifies contextual events classified as threats and corresponding probabilistic threat values for a second region (e.g., Office Space) of the site.

In some variations, S221 functions to form an intelligently integrated threat model structure by fusing the site graph together with the semantic graph of a subject site. In use, the integrated threat model may preferably function to compute threat inferences based on input of sensor data obtained from sensor data sources (e.g., 110*a-c*) of one or more macro regions of a site. A threat inference output from the integrated threat model preferably includes a probability-based indication of whether a threat exists or does not exist within a scene and/or based on sensor data of a subject site. Additionally, or alternatively, the integrated threat model may be used to generate any type or kind of classification of threat including a binary indication of threat (e.g., classification label of threat or no threat, etc.).

In some variations, constructing the integrated threat model in S221 includes integrating the semantic graph and the site graph based on coinciding sensor positioning data. Specifically, each of the semantic graph and the site graph are constructed with sensor positioning data identifying respective locations and/or positioning of sensors (e.g., 110*a-c*) relative to the detected semantic primitives and positioning of sensors within each macro region of a given site. That is, in addition to collecting semantic primitive data and encoding the semantic primitive data into a semantic graph, S221 may additionally function to encode a position of one or more sensors (e.g., 110*a-c*) (e.g., video cameras, etc.) or the like that operate to generate the semantic primitives. Similarly, in addition to identifying a configuration of a subject site including identifying macro regions and encoding configuration data of a subject site into a site graph, S221 may additionally function to encode a position of one or more sensors that operate within each of the distinct macro regions of the subject site into the site graph.

Accordingly, using the sensor positioning data as a connective tissue or a connective element, S221 may function to fuse together the semantic graph and the site graph based on overlapping (coinciding) sensor positioning data. For example, a sensing (e.g., surveillance) of a first macro region (e.g., a hallway of a site) may be performed by a first sensor data source (e.g., 110*a*) (e.g., Camera_1) and a second macro region (e.g., a classroom) may be monitored by a second sensor data source (e.g., 110*c*) (e.g., Camera_2). Further with this example, a first set of semantic primitive data may have been observed by the first sensor data source and a second set of semantic primitive data may have been observed by the second sensor data source. Accordingly, in this example, S221 may function to coordinate together or otherwise, link together (via a graph) the first macro region of the site with the first set of semantic primitive data that is generated by using sensor data provided by the first sensor data source that is positioned within the first macro region. Similarly, S221 may function to link (via a graph) the second macro region of a site graph with the second set of semantic primitive data that is generated by using sensor data provided by the second sensor data source that is positioned within the second macro region.

Additionally, or alternatively, S221 may function to construct the integrated threat model with probabilistic weightings and/or probabilistic threat values at each of the graph edges and graph nodes of the integrated threat model. In some embodiments, S221 may function to generate the probabilistic weightings and/or probabilistic threat values based on the probabilistic threat values identified in each of the site graph and the semantic graph. Thus, in such embodiments, the weightings and threat values encoded to the integrated threat model are generated based on a combination of the weightings and/or threat values of the site graph and the semantic graph. Accordingly, when contextual factors typically provided by a site graph are provided to the semantic graph, a threat or non-threat classification may be better evaluated and thus, a probabilistic threat weighting or threat probability of a graph edge and/or a graph node for a semantic primitive may be adjusted (e.g., increased or decreased) based on the graph integration. For example, the semantic graph may identify as semantic primitives a person, a stick, and an activity of the person holding the stick. If this scenario is combined with a site graph in which the semantic primitives are detected in a macro region outside a facility or building of a subject site, the threat probability may be judged to be low. However, if the scenario is combined with a site graph in which the semantic primitives are detected in a macro region inside a facility of a subject site, the threat probability may be judged to be high. In these examples, whether the threat probability is judged to be high or low is preferably based on a comparison of a threat probability value to one or more predetermined or dynamic threat thresholds.

2.4 Implementing an Integrated Machine Learning-Based Threat Model

In some variations, S230 includes implementing the integrated threat model into a live machine learning based (video) surveillance or security system for detecting and/or mitigating threats. In some variations, S230 functions to implement the integrated threat model to build or compute one or more threat inferences based on a classification and/or identification of semantic primitives by the integrated threat model together with a classification or indication of one or more contextual factors including macro regions, time or occurrence data, in which the semantic primitives are observed as extracted from sensor data.

In some variations, a threat probability for a detected site event or site activity involving one or more semantic primitives (and optionally contextual data) is computed based on an evaluation of a graph chain of the site activity that extends from a root node of the integrated threat model (e.g., the root nodes shown in each of FIGS. 8B and 8C) to a graph node within the integrated threat model.

In some variations, S230 includes identifying at least one contextual event S231. In some variations, S231 includes selecting a portion of the threat model based on contextual data (e.g., a region of the site). In some embodiments, the threat model can incorporate a site graph, with nodes and edges representing different regions of the site. For example, in a case where contextual data identifies an event detected in the kitchen, the portion of the graph shown in FIG. 8B, which relates to the kitchen, is selected. In some implementations, S231 includes identifying a graph chain (path) from one node of the integrated threat model to another node of the threat model that includes information identified by at least one of the comprehension system 120 and the event detection system 150 during implementing the threat model. In some implementations, identifying a graph chain includes processing sensor data at a given time to generate at least one semantic primitive, determining co-occurrence of contextual data with at least one primitive to generate at least one contextualized primitive, and identifying a graph chain that identifies each determined semantic primitive and contextualized primitive that is associated with the given time. In some implementations, identifying a graph chain includes processing sensor data at a given time to generate at least one semantic primitive, determining co-occurrence of contextual data, and identifying a graph chain that identifies each determined semantic primitive and co-occurring element of contextual data that is associated with the given time. In some implementations, identifying a graph chain includes processing sensor data at a given time to generate at least one semantic primitive, identifying a graph chain that identifies each determined semantic primitive associated with the given time.

In some implementations, the identified graph chain represents a contextual event identified during implementation of the threat model. For example, as shown in FIG. 8B, the chain from the Root node to the "During Business Hours" node represents the contextual event "Person holding knife during business hours". As shown in FIG. 8B, the chain identifies semantic primitives (e.g., "Person") and contextual data (e.g., "During Business Hours").

In some variations, S230 includes classifying each identified contextual event S232. In some variations, S232 includes classifying a contextual event as a threat (or a non-threat).

In some variations, S232 includes traversing a graph chain of an identified contextual event to compute a threat inference. In some implementations, computing a threat inference includes: computing a probabilistic threat value for the identified contextual event. In some implementations, S232 includes identifying a location of a sensor which generated sensor data used to identify the contextual event and identifying semantic primitives related to the contextualized event. In some implementations, once the semantic primitives of the contextualized event are identified, S232 functions to travel down the graph chain (for the contextualized event) beginning with a graph node at the outer most extent of the graph chain to a root node of the integrated threat model. In some implementations, as S232 travels down the graph chain, the threat probabilities along the graphical chain are combined in one or more manners to produce a threat probability for the identified contextualized event. It shall be noted that the threat probability may also be computed traveling up the graph chain from a root node of the integrated threat model.

Accordingly, S230 may function to output the threat probability value in response to the evaluation of the graph chain associated with the detected contextualized event. If the threat probability value satisfies and/or exceeds a threat threshold, S230 may additionally or alternatively function to perform at least one action S233. In some implementations, S233 includes at least one of triggering an alert and triggering one or more threat mitigation protocols (e.g., lockdown, dispatching security, etc.).

2.5 Anomaly Learning

Figure 6:
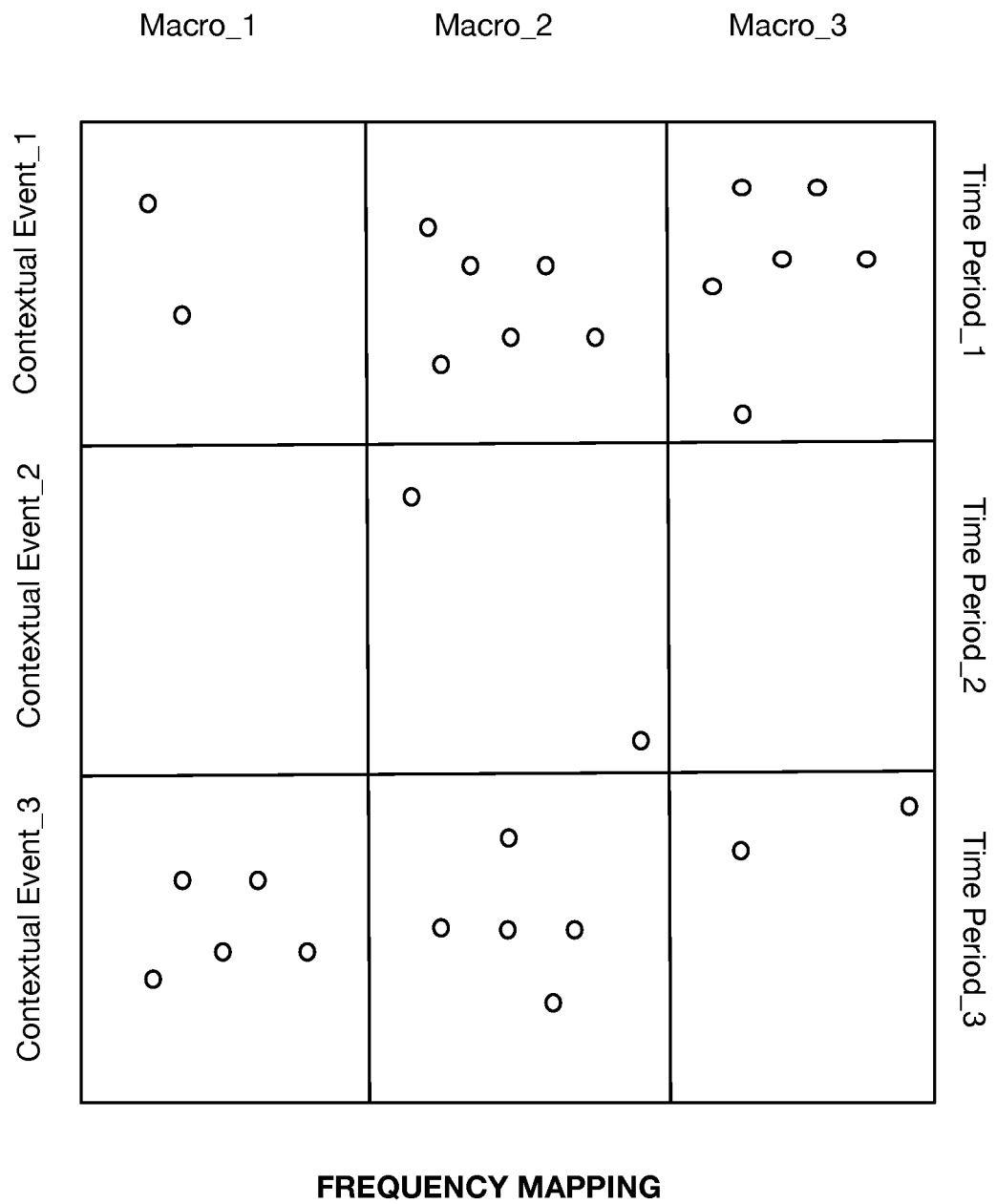
FIG. 6 illustrates a schematic of a frequency map, in accordance with embodiments.

In some variations, S222 includes enabling persistent learning by the integrated threat model. In some variations, S222 includes constructing a site activity frequency mapping that enables the integrated threat model to persistently learn of new normal contextual events, non-normal contextual events, anomalous contextual events, and threats at a subject site, as shown by way of example in FIG. 6.

In some variations, S222 functions to construct the site activity frequency mapping as a multi-dimensional matrix (e.g., a 3-D matrix) that preferably includes contextual events, macro regions, and time of day data as its dimensions. In some variations, in constructing the site activity frequency mapping, S222 functions to observe and/or evaluate sensor data of a given site to determine a number of instances in which a contextual event is observed, an identification of a macro region in which the contextual event is observed, and a time of day that the contextual event was observed within the identified macro region. Accordingly, over time or during a learning of the integrated threat model, S222 may function to populate the site activity frequency mapping with frequency data relating to a number of instances that each of a plurality of contextual events is observed in each of a plurality of macro regions of a subject site.

In some variations, S222 functions to generate and/or identify a probability of occurrence for each contextual event and/or for each collection or group of contextual events. In some variations, the contextual event having a higher probability of occurrence may be classified or labeled as contextual event that are less likely to be a threat or may be assigned a normal classification label. That is, if the probability of occurrence satisfies or exceeds a normal or threat threshold, S222 assigns the non-threat or normal classification label. Conversely, the contextual event having a lower probability of occurrence may be classified or labeled as contextual event that are more likely to be a threat or may be assigned a threat classification label (e.g., the lower probability that satisfies or that is below a threat probability threshold).

In some variations, for any newly identified contextual event or threat or non-threat, S222 functions to encode the threat model to include the newly identified contextual event thereby enhancing a learning of the integrated threat model.

In some variations, S222 includes determining a frequency of occurrence of at least one contextualized event. S222 can include determining a frequency of occurrence of the contextualized event within at least one of the plurality of regions of the site. Alternatively, or additionally, S222 can include determining a frequency of occurrence of the contextualized event within at least one of a plurality of time periods. In some implementations, a contextualized event is classified as a threat in a case where the determined frequency of occurrence is below a threshold value. In some implementations, the contextualized event is classified as a threat for at least one region of the site. In some implementations, the contextualized event is classified as a threat for at least one time period.

In some variations, at least one of the systems 120 and 150 is implemented as a single hardware device. In some embodiments, at least one of the systems 120 and 150 is implemented as a plurality of hardware devices.

2.6 User Interface

Figure 5A:
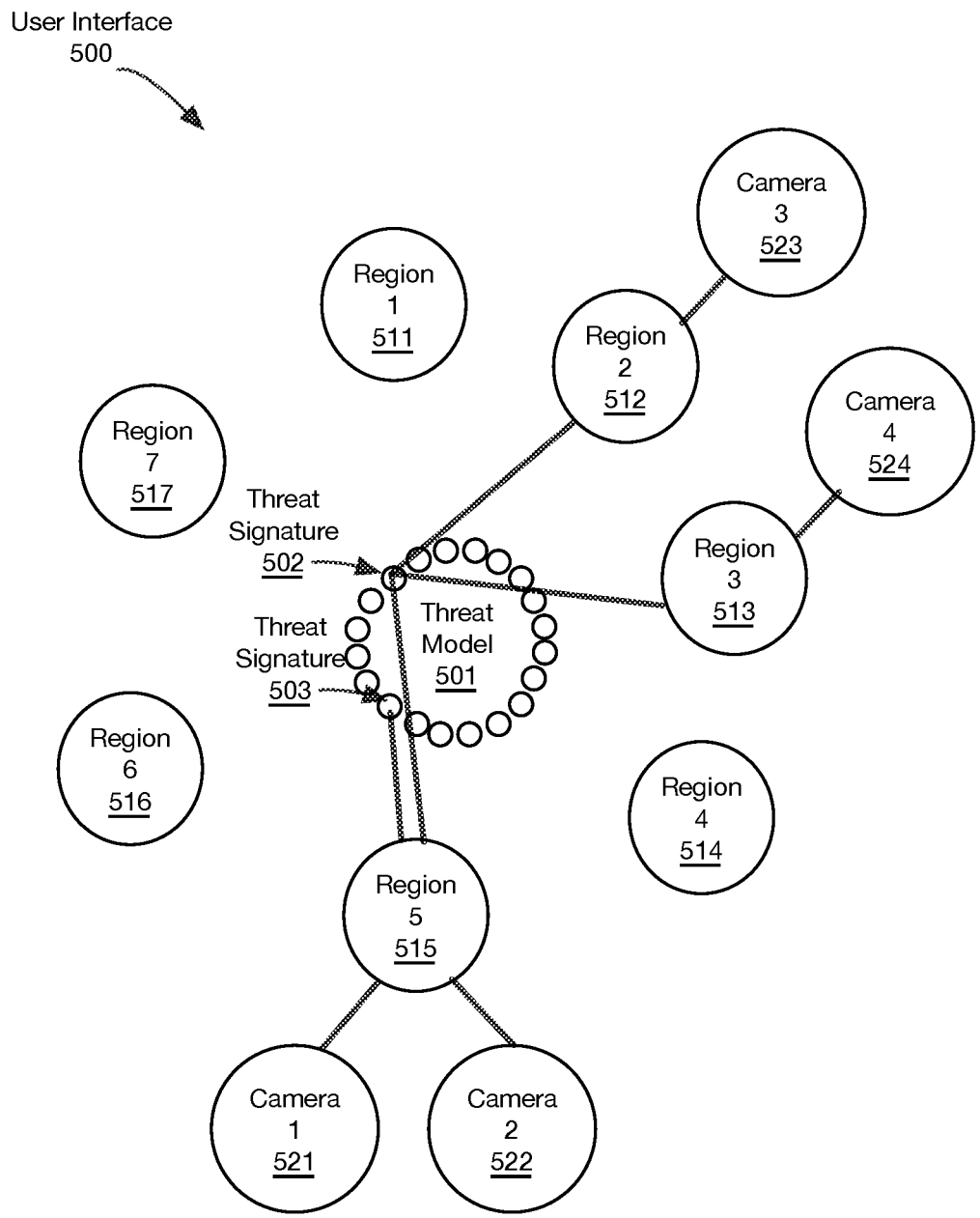
FIGS. 5A-B illustrate a user interface, in accordance with embodiments.
Figure 5B:
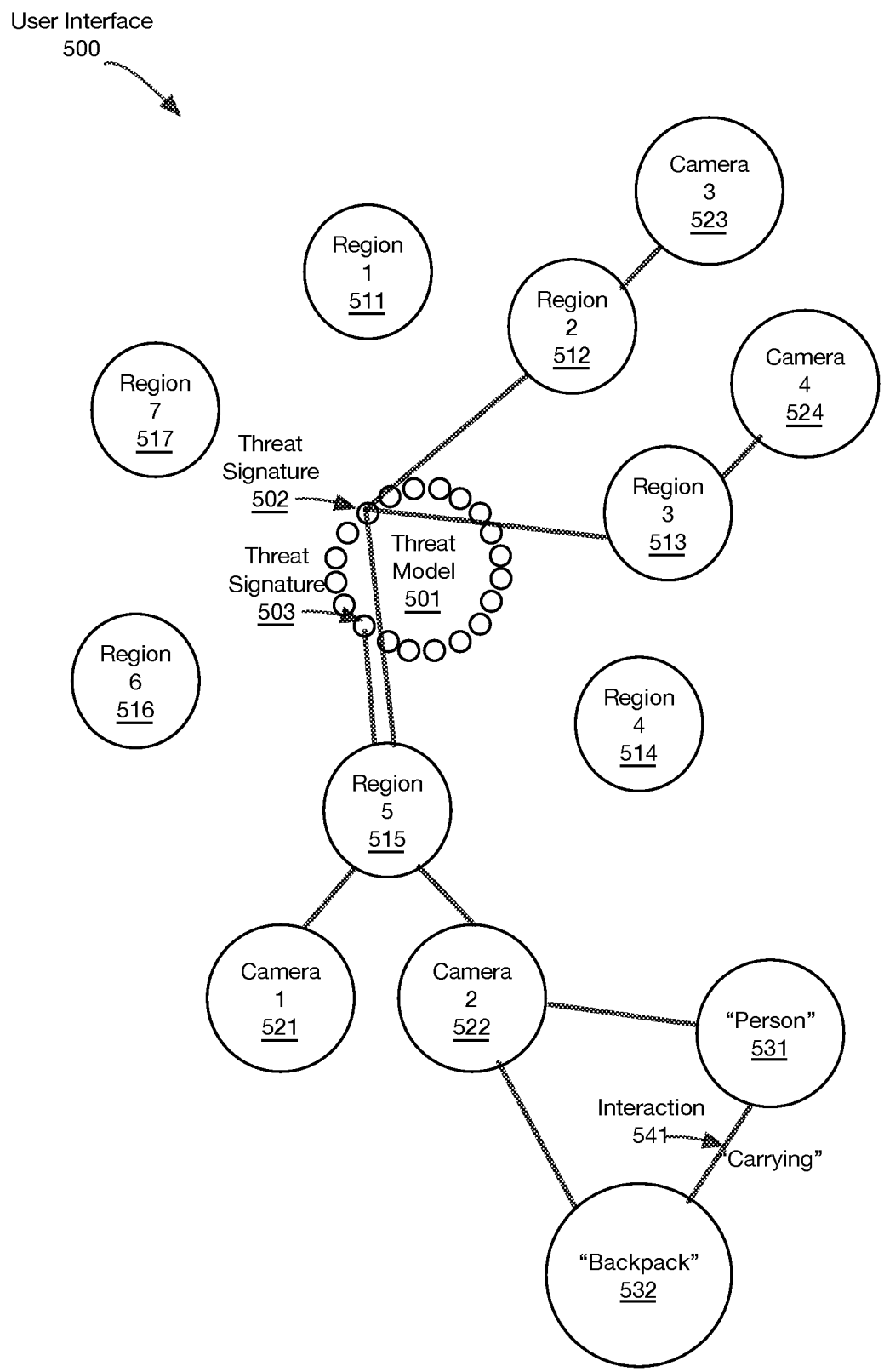

FIGS. 5A-5B illustrate a user interface 500, according to variations. In some variations, the user interface 500 is displayed by the user interface system 130. As shown in FIGS. 5A and 5B, the user interface 500 includes a visual representation for a threat model 501, visual representations (e.g., 502, 503) for threat signatures included in the threat model 501, visual representations 511-517 for regions of a site (e.g., macro regions, semantic zones, etc.), and visual representations 521-524 for cameras positioned at the site. As shown in FIGS. 5A and 5B, a line connecting a region to a threat signature indicates that the threat signature is deployed on the region. For example, as shown in FIG. 5A, the threat signature 502 (of the model 501) is deployed at regions 512, 513 and 515, and the threat signature 503 (of the model 501) is deployed at region 515. As shown in FIGS. 5A and 5B, a line connecting a region to a camera indicates that the camera belongs to the region. For example, as shown in FIG. 5A, the camera 523 belongs to the region 512, the camera 524 belongs to the region 513, the camera 521 belongs to the region 515, and the camera 522 belongs to the region 515.

In some variations, semantic primitives generated by the comprehension system 120 are displayed in the user interface 500. In some variations, contextual events detected by the contextual event detection system 150 are displayed in the user interface 500. As shown in FIG. 5B, the user interface displays visual representations (e.g., 531, 532, 541) for semantic primitives detected by using sensor data generated by the camera 522. As shown in FIG. 5B, a "Person" 531 and a "Backpack" 532 are detected by using the sensor data from the camera 522, and the user interface displays visual representations for the "Person" 531 and the "Backpack" 532, visually connected to the visual representation of the camera 522. As shown in FIG. 5B, the user interface displays a line connecting the visual representations 531 and 532 to represent an interaction 541 ("carrying") between the "Person" 531 and the "Backpack" 532. In some variations, the interaction 541 is detected by the sensor data comprehension system 120.

2.7 System Architecture

FIG. 7 shows a hardware device 700. In some variations, a hardware device 700 implementing at least one of the systems 120 and 150 includes a bus 701 that interfaces with the processors, a main memory 722 (e.g., a random access memory (RAM)), a read only memory (ROM) 704, a processor-readable storage medium 705, and a network device 711. In some variations, the bus 701 interfaces with at least one of a display device 791 and a user input device 792.

In some embodiments, the processors 703A-703N include one or more of an ARM processor, an X86 processor, a GPU (Graphics Processing Unit), a tensor processing unit (TPU), and the like. In some embodiments, at least one of the processors includes at least one arithmetic logic unit (ALU) that supports a SIMD (Single Instruction Multiple Data) system that provides native support for multiply and accumulate operations.

In some embodiments, at least one of a central processing unit (processor), a GPU, and a multi-processor unit (MPU) is included.

In some embodiments, the processors and the main memory form a processing unit 799. In some embodiments, the processing unit includes one or more processors communicatively coupled to one or more of a RAM, ROM, and machine-readable storage medium; the one or more processors of the processing unit receive instructions stored by the one or more of a RAM, ROM, and machine-readable storage medium via a bus; and the one or more processors execute the received instructions. In some embodiments, the processing unit is an ASIC (Application-Specific Integrated Circuit). In some embodiments, the processing unit is a SoC (System-on-Chip).

In some embodiments, the processing unit includes at least one arithmetic logic unit (ALU) that supports a SIMD (Single Instruction Multiple Data) system that provides native support for multiply and accumulate operations. In some embodiments the processing unit is a Central Processing Unit such as an Intel processor.

The network adapter device 711 provides one or more wired or wireless interfaces for exchanging data and commands. In some embodiments, the system 700 is communicatively coupled to at least one of a sensor data source and a user interface system via the network adapter device 711. Such wired and wireless interfaces include, for example, a universal serial bus (USB) interface, Bluetooth interface, Wi-Fi interface, Ethernet interface, near field communication (NFC) interface, and the like.

Machine-executable instructions in software programs (such as an operating system, application programs, and device drivers) are loaded into the memory (of the processing unit) from the processor-readable storage medium, the ROM or any other storage location. During execution of these software programs, the respective machine-executable instructions are accessed by at least one of processors (of the processing unit) via the bus, and then executed by at least one of processors. Data used by the software programs are also stored in the memory, and such data is accessed by at least one of processors during execution of the machine-executable instructions of the software programs. The processor-readable storage medium is one of (or a combination of two or more of) a hard drive, a flash drive, a DVD, a CD, an optical disk, a floppy disk, a flash storage, a solid state drive, a ROM, an EEPROM, an electronic circuit, a semiconductor memory device, and the like.

In some variations, the processor-readable storage medium 705 includes at least one of contextual data 140, sensor data 121, contextual event data 152, raw sensor data, and machine-executable instructions. In some variations, the machine-executable instructions include instructions for at least one of an operating system 730, software programs 713, device drivers 714, the sensor data comprehension system 120, the contextual event detection system 150, the control system 160, the notification system 170, and the user interface system 130.

The system and methods of the preferred embodiment and variations thereof can be embodied and/or implemented at least in part as a machine configured to receive a computer-readable medium storing computer-readable instructions. The instructions are preferably executed by computer-executable components preferably integrated with the system and one or more portions of the processor and/or the controller. The computer-readable medium can be stored on any suitable computer-readable media such as RAMs, ROMs, flash memory, EEPROMs, optical devices (CD or DVD), hard drives, floppy drives, or any suitable device. The computer-executable component is preferably a general or application specific processor, but any suitable dedicated hardware or hardware/firmware combination device can alternatively or additionally execute the instructions.

What is claimed is:

1. A method comprising: with a surveillance system that is communicatively coupled to a plurality of sensor data sources arranged at locations within a plurality of regions of a site under surveillance:
accessing a threat model, represented as a graph structure, that identifies contextual events classified as threats, the graph structure comprising nodes representing detected entities and edges connecting pairs of nodes, each edge identifying an interaction semantic primitive associated with the respective pair of nodes, wherein contextual events are represented as a path comprising at least one edge between connected pairs nodes of the graph structure;
automatically adding new contextual events to the threat model by performing a machine learning process using historical data that identifies frequency of occurrence for at least one contextual event;
identifying at least one contextual event for a site in real-time by processing:
sensor data generated by the sensor data sources, and
co-occurring contextual data for at least one of the regions;
based on probabilistic threat values assigned to at least one of a node and an edge of the path that represents the contextual event, classifying each identified contextual event as one of a threat and a non-threat by using the threat model in real-time;
responsive to classification of an identified contextual event as a threat, controlling a notification system to generate an alert;
automatically identifying a threat response contextual event that identifies dispatching of emergency response services performed for the alert by processing sensor data generated by the sensor data sources; and
based on the identified threat response contextual event, updating a probabilistic threat value of at least one contextual event represented by the threat model.

2. The method of claim 1, wherein at least one contextual event represented by the threat model identifies at least one semantic primitive and at least one element of contextual data.

3. The method of claim 2, wherein identifying at least one contextual event comprises:
processing the sensor data in real-time to generate at least one semantic primitive;
accessing the co-occurring contextual data, the co-occurring data relating to the processed sensor data; and
identifying a path of the graph structure that represents each generated semantic primitive and the accessed co-occurring contextual data, the path representing the at least one contextual event.

4. The method of claim 1,
wherein at least one contextual event represented by the threat model identifies at least one contextualized primitive.

5. The method of claim 4, wherein identifying at least one contextual event comprises:
processing the sensor data in real-time to generate at least one semantic primitive;
accessing the co-occurring contextual data, the co-occurring data relating to the processed sensor data;
transforming at least one generated semantic primitive into a contextualized primitive by using the accessed co-occurring contextual data; and
identifying a path of the graph structure that represents each contextualized primitive, the path representing the at least one contextual event.

6. The method of claim 1,
further comprising: generating the co-occurring contextual data from sensor data generated by the plurality of sensor data sources, and storing the contextual data in a contextual data storage,
wherein identifying at least one contextual event comprises accessing the stored co-occurring contextual data.

7. The method of claim 1, wherein a first pair of detected entities is associated with at least one contextual event represented by the threat model, wherein the first pair of detected entities includes a handheld object and a person.

8. The method of claim 1, wherein at least one contextual event represented by the threat model identifies at least one interaction semantic primitive that identifies an interaction with at least one contextualized primitive.

9. The method of claim 1, further comprising removing a contextual event from the threat model.

10. The method of claim 1, wherein identifying at least one contextual event comprises: extracting high-level features from the sensor data by using a high-level feature detection model, and processing the high-level features by using each sub-model of a machine learning ensemble to generate a plurality of semantic primitives.

11. The method of claim 10, further comprising: training the high-level feature extraction model based on output of each sub-model of the machine learning ensemble.

12. A surveillance system comprising:
a plurality of sensor data sources arranged at locations within a plurality of regions of a site under surveillance;
at least one processor; and
at least one computer-readable storage medium that includes instructions, that when executed by the at least one processor, control the at least one processor to:
access a threat model, represented as a graph structure, that identifies contextual events classified as threats, the graph structure comprising nodes representing detected entities and edges connecting pairs of nodes, each edge identifying an interaction semantic primitive associated with the respective pair of nodes, wherein contextual events are represented as a path comprising at least one edge between connected pairs of nodes of the graph structure,
automatically add new contextual events to the threat model by performing a machine learning process using historical data that identifies frequency of occurrence for at least one contextual event,
generate a plurality of semantic primitives in real-time by processing sensor data generated by the plurality of sensor data sources arranged at locations within the plurality of regions of the site,
identify at least one contextual event for the site in real-time by processing: the semantic primitives and elements of contextual data that are co-occurring with the semantic primitives, and based on probabilistic threat values assigned to at least one of a node and an edge of the path that represents the contextual event, classify each identified contextual event as one of a threat and a non-threat by using the threat model in real-time, responsive to classification of an identified contextual event as a threat, control a notification system to generate an alert, automatically identify a threat response contextual event that identifies dispatching of emergency response services performed for the alert by processing sensor data generated by the sensor data sources, and based on the identified threat response contextual event, update a probabilistic threat value of at least one contextual event represented by the threat model.

13. The system of claim 12 wherein identifying at least one contextual event comprises:

transforming at least one generated semantic primitive into a contextualized primitive by using the co-occurring contextual data; and identifying a path of the graph structure that represents each contextualized primitive, the path representing the at least one contextual event.

14. The system of claim 13, wherein generating a plurality of semantic primitives comprises: extracting high-level features from the sensor data by using the high-level feature detection model, and processing the high-level features by using each sub-model of the machine learning ensemble to generate the plurality of semantic primitives.

* * * * *